US006185675B1

United States Patent
Kranich et al.

(10) Patent No.: US 6,185,675 B1
(45) Date of Patent: Feb. 6, 2001

(54) BASIC BLOCK ORIENTED TRACE CACHE UTILIZING A BASIC BLOCK SEQUENCE BUFFER TO INDICATE PROGRAM ORDER OF CACHED BASIC BLOCKS

(75) Inventors: Uwe Kranich, Munich (DE); David S. Christie, Austin, TX (US)

(73) Assignee: Advanced Micro Devices, Inc., Sunnyvale, CA (US)

(*) Notice: Under 35 U.S.C. 154(b), the term of this patent shall be extended for 0 days.

(21) Appl. No.: 09/137,579

(22) Filed: Aug. 21, 1998

Related U.S. Application Data

(60) Provisional application No. 60/062,774, filed on Oct. 24, 1997.

(51) Int. Cl.[7] .................................................... G06F 9/38
(52) U.S. Cl. .......................................... 712/238; 711/125
(58) Field of Search .................................. 712/236, 233, 712/238, 239, 240; 711/125, 137

(56) References Cited

U.S. PATENT DOCUMENTS

| 4,437,149 | 3/1984 | Pomerene et al. . | |
|---|---|---|---|
| 5,353,419 | 10/1994 | Touch et al. . | |
| 5,381,533 | * 1/1995 | Peleg et al. ........................... | 712/215 |
| 5,669,011 | 9/1997 | Alpert et al. . | |
| 5,822,559 | 10/1998 | Narayan et al. . | |
| 6,014,742 | * 1/2000 | Krick et al. ........................... | 712/236 |
| 6,018,786 | * 1/2000 | Krick et al. ............................... | 711/4 |

OTHER PUBLICATIONS

Patt, Yale N. et al., One Billion Transistors, One Uniprocessor, One Chip, IEEE, Sep. 1997, pp. 51–57.*

Jacobson, et al., "Path–Based Next Trace Prediction," MICRO 30 Proceedings, Dec. 1997, IEEE Computer Society, pp. 14–23.

Friendly, et al., "Alternative Fetch and Issue Policies for the Trace Cache Fetch Mechanism," MICRO 30 Proceedings, Dec. 1997, IEEE Computer Society, pp. 24–33.

Rotenberg, et al., "Trace Processors," MICRO 30 Proceedings, Dec. 1997, IEEE Computer Society, pp. 138–148.

Rotenberg, et al., "Trace Cache: a Low Latency Approach to High Bandwidth Instruction Fetching," MICRO 29 Proceedings, Dec. 1996, IEEE Computer Society.

Patel, et al., "Improving Trace Cache Effectiveness with Branch Promotion and Trace Packing," ISCA 25 Proceedings, IEEE publication, 1998, ACM Press, pp. 262–271.

* cited by examiner

*Primary Examiner*—Richard L. Ellis
(74) *Attorney, Agent, or Firm*—Conley Rose & Tayon, P.C.; Dan R. Christen

(57) ABSTRACT

A cache memory configured to access stored instructions according to basic blocks is disclosed. Basic blocks are natural divisions in instruction streams resulting from branch instructions. The start of a basic block is a target of a branch, and the end is another branch instruction. A microprocessor configured to use a basic block oriented cache may comprise a basic block cache and a basic block sequence buffer. The basic block cache may have a plurality of storage locations configured to store basic blocks. The basic block sequence buffer also has a plurality of storage locations, each configured to store a block sequence entry. The block sequence entry may comprise an address tag and one or more basic block pointers. The address tag corresponds to the fetch address of a particular basic block, and the pointers point to basic blocks that follow the particular basic block in a predicted order. A system using the microprocessor and a method for caching instructions in a block oriented manner rather than conventional power-of-two memory blocks are also disclosed.

27 Claims, 22 Drawing Sheets

Basic Block Execution Architecture

Basic Block Tree

| | 70 | 72 | 74 | 76 | 78 |
|---|---|---|---|---|---|
| Cycle | BBSB Adr-in | BBSB Adr ptr-out | BBC Adr-in | BBC Ins-out |
| | | | | | |
| 0 | n | n+1; n+2 | | |
| 1 | n+2 | n+3; n+4 | n; n+1 | n; n+1 |
| 2 | n+4 | n+5; n+6 | n+2; n+3 | n+2; n+3 |

BB lookup pipeline

BBSB Addressformat

Sample BB sequence

| Sequential BB | Start adr. | End adr. |
|---|---|---|
| 1 | 2000 | 2001 |
| 2 | 2002 | 2003 |
| 3 | 2004 | 2005 |
| 4 | 2006 | 2007 |

Sequential BB's with size of 2 byte

|   | Field | Size | Function |
|---|---|---|---|
| 90 { | BB2_ADR | 32 Bit | Address of BB2 |
|   | BB3_ADR | 32 Bit | Address of BB3 |
| 92 { | BB2_1_ADR | 32 Bit | Address of BB2_1 |
|   | BB2_2_ADR | 32 Bit | Address of BB2_2 |
|   | BB3_1_ADR | 32 Bit | Address of BB3_1 |
|   | BB3_2_ADR | 32 Bit | Address of BB3_2 |
| 94 { | PBR1 | ? | Predictor of Branch 1 |
|   | PBR2 | ? | Predictor of Branch 2 |
|   | PBR3 | ? | Predictor of Branch 3 |
| 96 | Status | ? | Line Status information |
| 98 | Replacement | ? | Line replacement info |

BBSB LINE STRUCTURE

BBSB Address Select

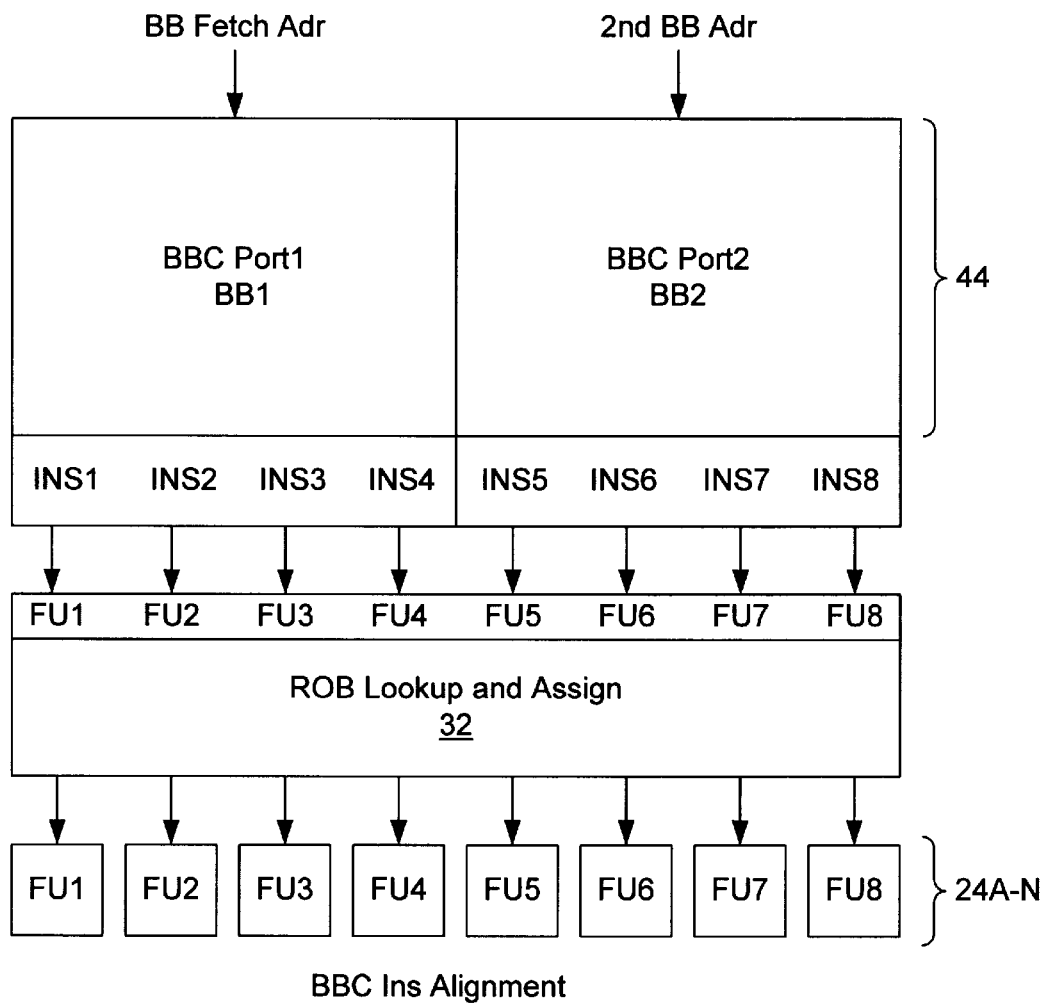
Fig. 13 BBC Ins Alignment
Fig. 14 BBC Line structure

| I1 | I2 | I3 | I4 | I5 | !6 | I7 | I8 |
|---|---|---|---|---|---|---|---|
|  |  |  |  |  |  |  |  |
| INS1 | INS2 | JMP | NULL | INS10 | INS11 | JMP | NULL |

| Clock | 0 | 1 | 2 | 3 | 4 |
|---|---|---|---|---|---|
| | | | | | |
| Stage | | | | | |
| | | | | | |
| BBSB | BBSB4 | BBSBC | | | |
| BBC | BBSB3 | | BBSBC | | |
| ROB | BBSB2 | | | BBSBC | |
| EXEC | BBSB1 | | | | BBSBC |
| WB | | | | | |
| RETIRE | | | | | |
| | | | | | |

BB postion relative to INV_ADR

| Bits | 31-5 | 4-3 | 2-0 |
|---|---|---|---|
| Contents | UP_INV_ADR | Index: 0-3 | 0 |
Fig. 19
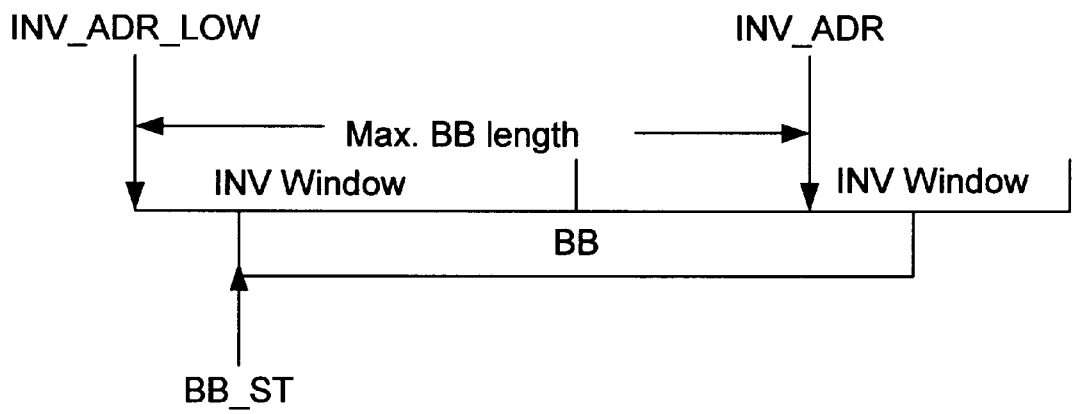
INV_ADR_LOW Generation
Fig. 20
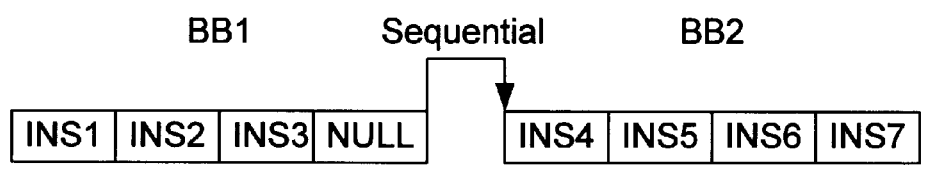
Maximum BB length exceeded
Fig. 21

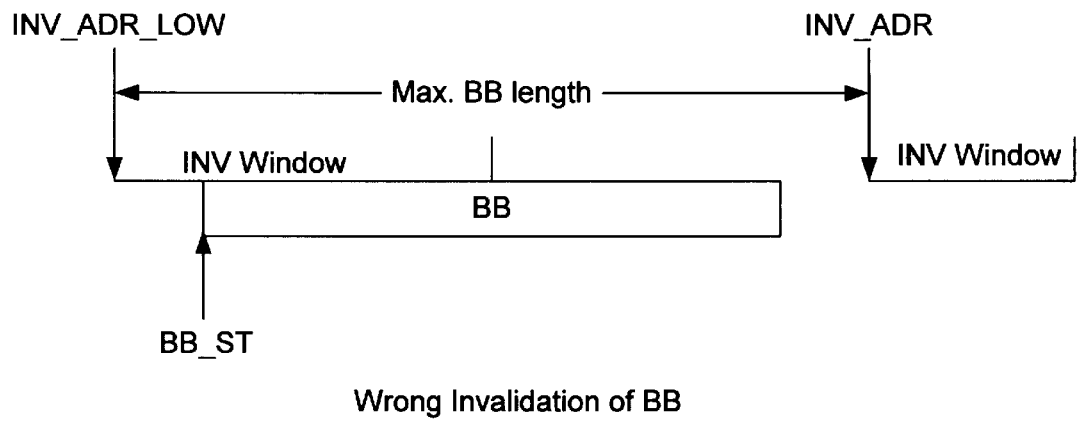
Wrong Invalidation of BB
Fig. 22
Before Code Modification
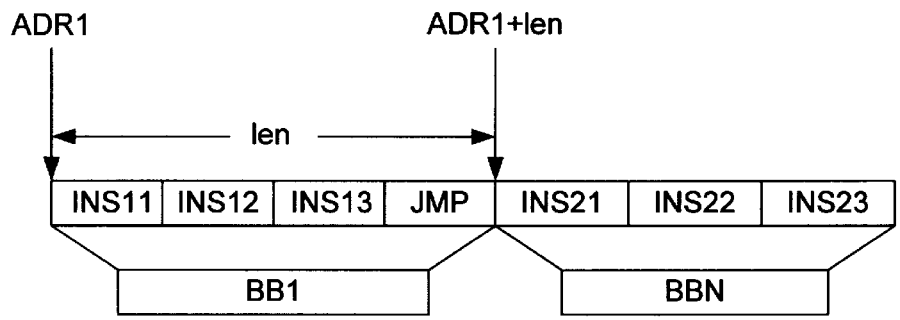
After Code Modification
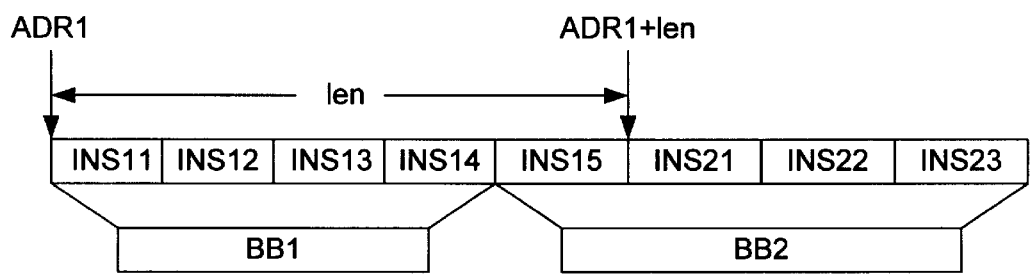
BB Change due to code modification
Fig. 23

Case 1: BBC Miss => BSB Miss
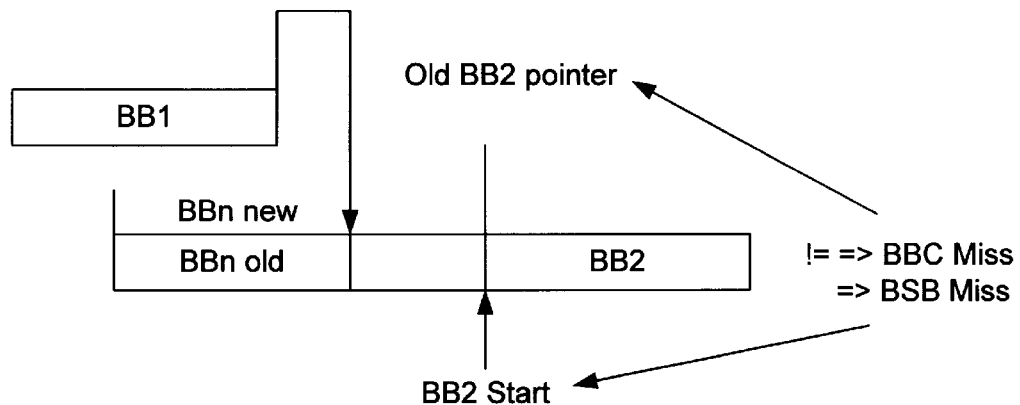
Case 2: Sequential BB changed
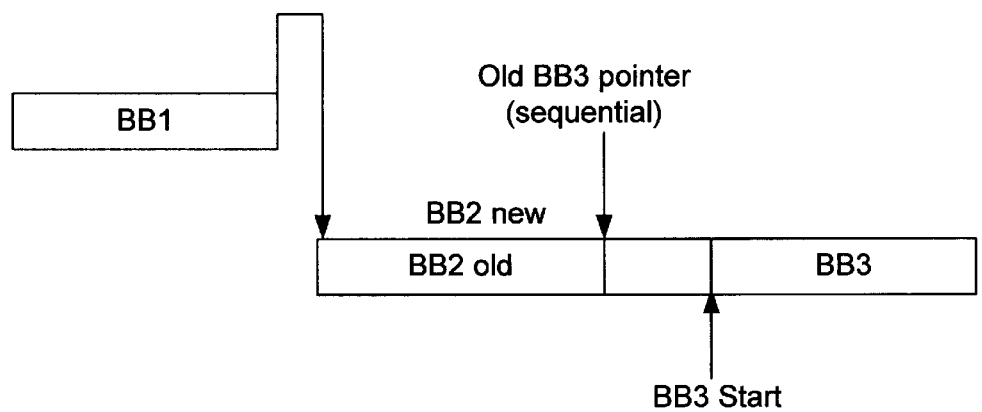
Fig. 24
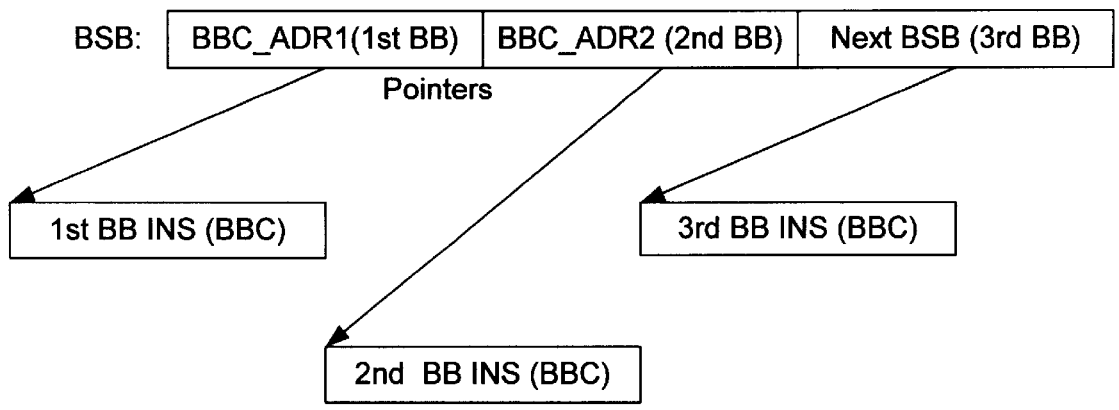
BBSB pointers to BB
Fig. 25

INS 1
mov esi, [eax]    ;Load jump pointer from table indexed with eax
jmp [esi]         ;Jump to different entry points of following basic block
                  ;entry points can be L1-L4.

L1:    INS11
       INS12
       INS13
L2:    INS21
       INS22
       INS23
L3:    INS31
       INS32
       INS33
L4:    INS 41
       INS 42
       INS 43

Fig. 26

| BB  | I1    | I2    | I3    | I4    |
|-----|-------|-------|-------|-------|
|     |       |       |       |       |
| x   | INS11 | INS12 | INS13 | INS21 |
| x+1 | INS22 | INS23 | INS31 | INS32 |
| x+2 | INS33 | INS41 | INS42 | INS43 |
|     |       |       |       |       |

Fig. 27    44

| BB  | I1    | I2    | I3    | I4    |
|-----|-------|-------|-------|-------|
|     |       |       |       |       |
| y   | INS21 | INS22 | INS23 | INS31 |
| y+1 | INS32 | INS33 | INS41 | INS42 |
| y+2 | INS43 | %     | %     | %     |
|     |       |       |       |       |

INS 1
mov esi, [eax]     ; Load jump pointer from table indexed with eax
jmp [esi]          ;Jump to different entry points of following basic block
                   ;entry points can be L1-L4.

L1:   INS11
L2:   INS12
      INS13
      INS14
      INS21
      INS22
      INS23
      INS24
      INS31
      INS32
      INS33
      INS34

Fig.29

Worst Case Overlapping

Multiple entry lookup in BBC

Different BB footprints

| cycle | BB1 | BB2 | BBSB entry |
|---|---|---|---|
|  |  |  |  |
| 0 | 0 | 1 | 0 |
| 1 | 2 | 3 | 2 |
| 2 | 0 | 1 | 0 |
| 3 | 3 | 0 | 3 |
| 4 | 1 | 3 | 1 |
| 5 | 0 | 1 | 0 |
|  |  |  |  |

BASIC BLOCK ORIENTED TRACE CACHE UTILIZING A BASIC BLOCK SEQUENCE BUFFER TO INDICATE PROGRAM ORDER OF CACHED BASIC BLOCKS

This application claims the benefit of Provisional Application 60/062,794, filed on Oct. 24, 1997.

BACKGROUND OF THE INVENTION

1. Field of the Invention

This invention relates to caching instructions in microprocessors, and more particularly to caching instructions using basic blocks.

2. Description of the Relevant Art

In their continuing effort to improve the performance of microprocessors, designers have increased operating frequencies while also increasing the number of instructions executed per clock cycle. As used herein, the term "clock cycle" refers to an interval of time during which each pipeline stage of a microprocessor performs its intended functions. At the end of each clock cycle, the resulting values are moved to the next pipeline stage. These higher frequencies and increases in concurrently executed instructions have caused designers to seek methods for simplifying the tasks performed during each pipeline stage. One way designers have achieved the desired simplification is to limit the number and variation of instructions the microprocessor must execute. These microprocessors are referred to as Reduced Instruction Set Computer (RISC) processors.

Despite the apparent advantages of RISC architectures, the widespread acceptance of the x86 family of microprocessors has forced manufacturers to continue to develop higher operating frequency, multiple-issue microprocessors capable of executing the more complex x86 instruction set. Designers have had reasonable success in increasing the performance of x86 compatible microprocessors by aggressively implementing features such as pipelining, out-of-order execution, branch prediction, and issuing multiple instructions for concurrent execution. Such "superscalar" microprocessors achieve relatively high performance characteristics while advantageously maintaining backwards compatibility with the vast amount of existing software developed for previous microprocessor generations such as the 8086, 80286, 80386, and 80486.

As previously noted, the x86 instruction set is relatively complex and is characterized by a plurality of variable length instructions. A generic format illustrative of the x86 instruction set is shown in FIG. 1. As the figure illustrates, an x86 instruction consists of from one to five optional prefix bytes 202, followed by an operation code (opcode) field 204, an optional addressing mode (Mod R/M) byte 206, an optional scale-index-base (SIB) byte 208, an optional displacement field 210, and an optional immediate data field 212.

The opcode field 204 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat the operation a number of times. The opcode field 204 follows the prefix bytes 202, if any, and may be one or two bytes in length. The addressing mode (Mod R/M) byte 206 specifies the registers used as well as memory addressing modes. The scale-index-base (SIB) byte 208 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field 210, which may be from one to four bytes in length. The displacement field 210 contains a constant used in address calculations. The optional immediate field 212, which may also be from one to four bytes in length, contains a constant used as an instruction operand. The shortest x86 instructions are only one byte long and comprise a single opcode byte. The 80286 sets a maximum length for an instruction at 10 bytes, while the 80386 and 80486 both allow instruction lengths of up to 15 bytes.

The complexity of the x86 instruction set poses many difficulties in implementing high performance x86-compatible superscalar microprocessors. One particular difficulty arising from the variable-length nature of the x86 instruction set is fetching instructions from an instruction cache. The term "fetching" refers to reading an instruction from a cache (or if it is not in the cache, then from main memory) and routing the instruction to the appropriate decode and or functional unit within the microprocessor for decoding and execution. Caches are low-latency, high-bandwidth memories either on the same monolithic chip as the microprocessor or on a separate chip mounted in close proximity to the microprocessor. Caches are typically structured as an array of storage locations, wherein each storage location is configured to store a predetermined number of instruction bytes. For example, a typical instruction cache may store 32 kilobytes and may be configured with individual storage locations each capable of storing 32 bytes. Each storage location is typically referred to as a "cache line".

Caches may be configured in a number of different ways. For example, many caches are set-associative, meaning that a particular line of instruction bytes may be stored in a number of different locations within the array. In a set-associative structure, the cache is configured into two parts, a data array and a tag array. Both arrays are two-dimensional and are organized into rows and columns. The column is typically referred to as the "way." Thus a four-way set-associative cache would be configured with four columns. A set-associative cache is accessed by specifying a row in the data array and then examining the tags in the corresponding row of the tag array. For example, when a prefetch unit searches its instruction cache for instructions residing at a particular address, a number of bits from the address are used as an "index" into the cache. The index selects a particular row within the data array and a corresponding row within the tag array. The number of address bits required for the index are thus determined by the number of rows configured into the cache. The tags addresses within the selected row are examined to determine if any match the requested address. If a match is found, the access is said to be a "hit" and the data cache provides the associated instruction bytes from the data array. If a match is not found, the access is said to be a "miss." When a miss is detected, the prefetch unit causes the requested instruction bytes to be transferred from the memory system into the data array. The address associated with the instruction bytes is then stored in the tag array.

Instruction bytes are read from main memory and then stored in the instruction cache until they are needed. In some embodiments, microprocessors may "predecode" the instruction bytes before they are stored in the instruction cache. Predecoding typically involves identifying the boundaries between consecutive instructions and possibly identifying the opcode bytes within the instruction. This predecode information is typically stored with the instruction bytes in the instruction cache. When instructions are fetched from the instruction cache, the predecode information is used to speed the alignment and decoding of the instructions.

After a requested instruction address is output to main memory, a predetermined number of sequential instruction bytes beginning at the requested address are read from main memory, predecoded, and then conveyed to the instruction cache for storage. The instruction bytes are stored into storage locations ("cache lines") according to their address, typically without regard to what types of instructions are contained within the sequence of instruction bytes.

One drawback, however, of traditional caches is that they suffer from inefficiencies because branch instructions and branch targets do not naturally occur at cache line boundaries. This may deleteriously affect performance because taken branch instructions residing in the middle of a cache line may cause the end portion of the cache line to be discarded when it is fetched. Furthermore, branch targets that are not located at the start of a cache line may similarly cause the beginning portion of the cache line to be discarded. For example, upon receiving a fetch address, the typical instruction cache reads the entire corresponding cache line, and then selection logic (either internal or external to the instruction cache) selects the desired instructions and discards instruction bytes before the target address and or after a branch instruction.

In addition to discarding fetched instruction bytes, an additional performance penalty results from the alignment required before the instruction bytes can be properly decoded. While the cache-related problems highlighted above may occur in both RISC and x86 instruction sets, the problems are typically aggravated by the variable-length nature of x86 instructions.

Thus, a method and apparatus for more easily accessing instruction bytes stored in a cache is desired. In addition, a method that would improve the cache performance of both RISC microprocessors and x86 compatible microprocessors would be particularly desirable.

SUMMARY OF THE INVENTION

The problems outlined above are in large part solved by a cache memory configured to access stored instructions according to basic blocks. Instruction streams have natural divisions that are determined by branches. These divisions are referred to herein as "basic blocks", with the start of a basic block being the target of a branch, and the end being another (taken) branch instruction. Thus, a method for caching instructions in a block oriented manner rather than the conventional power-of-2 memory blocks is contemplated.

In one embodiment, the method comprises receiving instruction bytes corresponding to a fetch address and decoding the instruction bytes into instructions. Next, basic blocks of instructions are formed by grouping the instructions into basic blocks ending with branch instructions. The basic blocks may be padded with NULL instructions if the basic blocks have less than a predetermined number of instructions. Conversely, the basic blocks may be divided into two or more basic blocks if the basic blocks have more than the predetermined number of instructions. Once formed, the basic blocks are stored into a basic block cache. Pointers corresponding to the basic blocks are stored into a basic block sequence buffer. The pointers are stored with branch prediction information to form predicted sequences of basic blocks which are output by the sequence buffer when it receives a corresponding fetch address. Multiple basic block pointers may be output and fetched from the basic block cache in a particular clock cycle.

A microprocessor configured to cache basic blocks of instructions is also contemplated. In one embodiment, the microprocessor comprises a basic block cache and a basic block sequence buffer. The basic block cache is configured to store basic blocks, wherein each basic block may comprise a number of instructions and may end with a branch instruction. The basic block sequence buffer comprises a plurality of storage locations, each configured to store a block sequence entry. The block sequence entry has an address tag and one or more basic block pointers. The address tag corresponds to the fetch address of a particular basic block, and the pointers point to basic blocks that follow that particular basic block in a predicted order. Each block sequence entry may contain multiple basic block pointers and branch prediction information to select the basic block that is predicted to follow the block corresponding to the address tag.

A computer system configured to utilize a basic block oriented cache is also disclosed. In one embodiment, the system comprises a microprocessor having a basic block cache and a basic block sequence buffer. The basic block cache and basic block sequence buffer may be configured as described above. A CPU bus may be coupled to the microprocessor, and a modem may be coupled to the CPU bus via a bus bridge.

BRIEF DESCRIPTION OF THE DRAWINGS

Other objects and advantages of the invention will become apparent upon reading the following detailed description and upon reference to the accompanying drawings in which:

FIG. 13 illustrates one possible configuration of the functional units from FIG. 2.

FIG. 14 is a diagram detailing one embodiment of a cache line within one embodiment of the BBC from FIG. 2.

FIG. 19 is a diagram illustrating one exemplary division of INV_ADR.

FIG. 20 is a diagram showing one possible method for generating INV_ADR_LOW.

FIG. 21 is a diagram illustrating one example of exceeding maximum basic block length.

FIG. 22 is a diagram illustrating improper invalidation of a basic block.

FIG. 23 is a diagram illustrating changes to basic blocks as the result of self-modifying code.

FIG. 24 is a diagram illustrating a situation which may result in the loading of an improper basic block.

FIG. 25 is a diagram illustrating pointers to basic blocks.

FIG. 26 is a diagram illustrating code with multiple jump targets.

FIG. 27 is a diagram illustrating one possible method for storing instructions within one embodiment of the BBC from FIG. 2.

FIG. 29 is a diagram illustrating one possible overlapping scenario for basic blocks.

Figure 1:
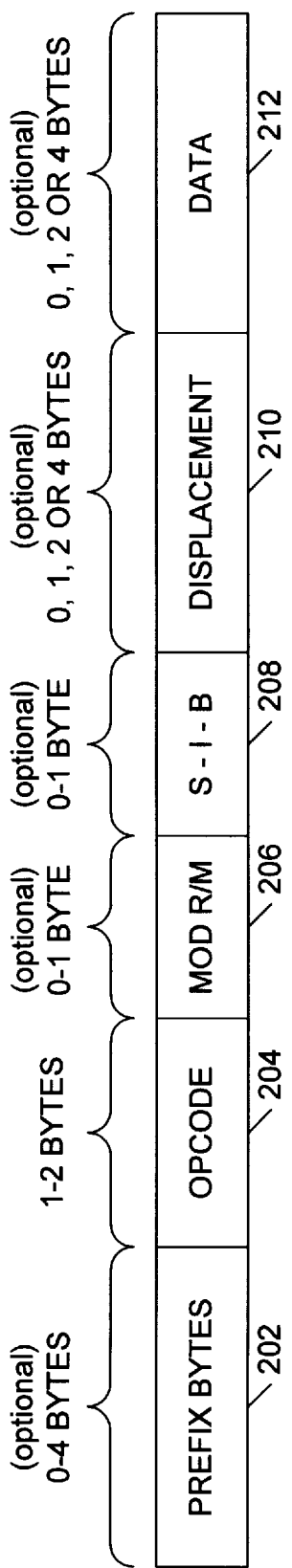
FIG. 1 is a diagram illustrating the generic format of the x86 instruction set.

While the present invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

First, a general description of one embodiment of a superscalar microprocessor configured to store instructions in a "basic block oriented" instruction cache will be given. After the general description, more details of the operation of the instruction cache and basic block oriented nature of microprocessor 10 will be discussed.

Exemplary Embodiment of a Microprocessor

Figure 2:
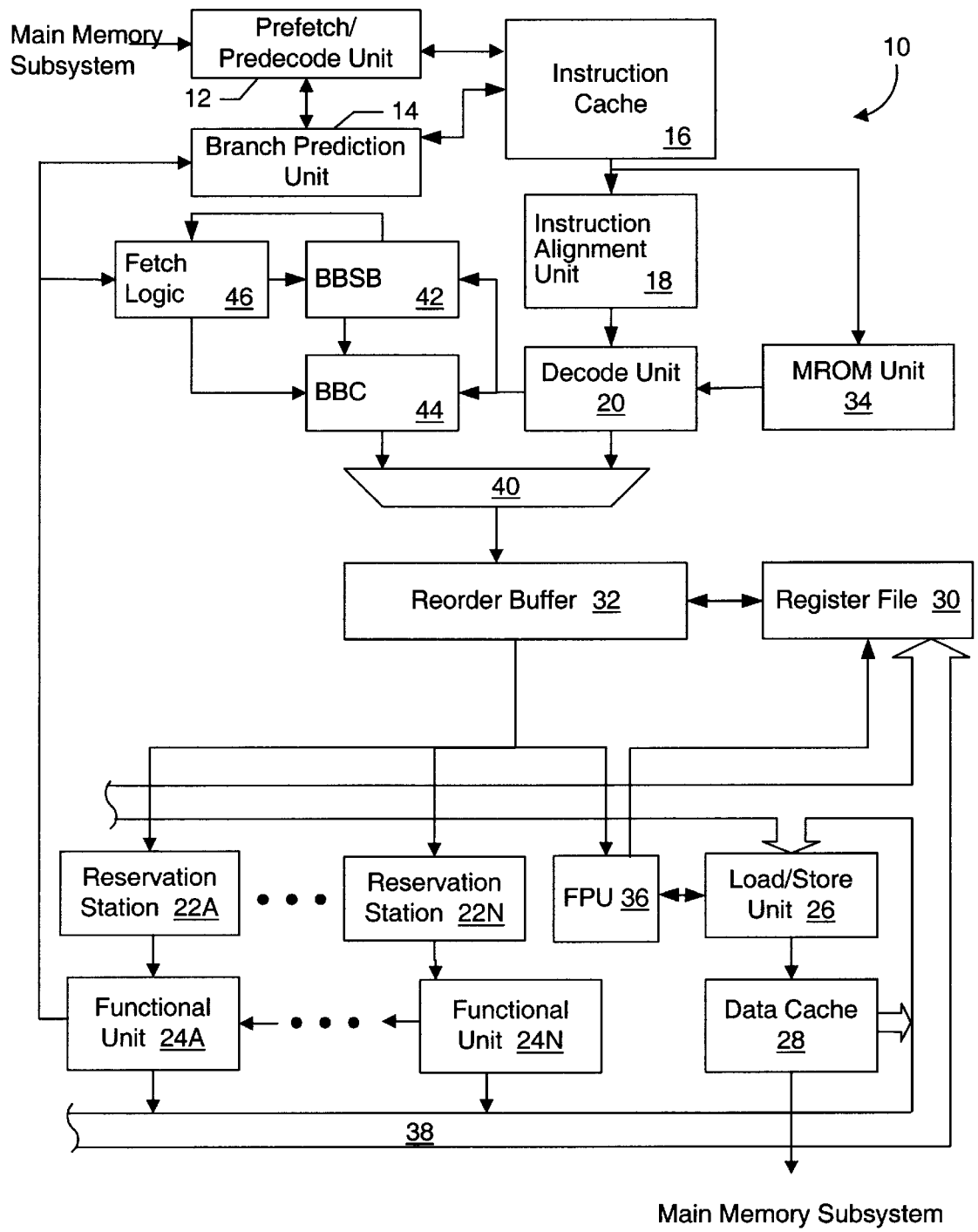
FIG. 2 is a block diagram of one embodiment of a microprocessor configured to employ basic block oriented instruction caching.

Turning now to FIG. 2, a block diagram of one embodiment of a microprocessor 10 is shown. Microprocessor 10 includes a prefetch/predecode unit 12, a branch prediction unit 14, an instruction cache 16, an instruction alignment unit 18, a decode unit 20, a plurality of reservation stations 22A–22N, a plurality of functional units 24A–24N, a load/store unit 26, a data cache 28, a register file 30, a reorder buffer 32, an MROM unit 34, a floating point unit (FPU) 36, a multiplexer 40, a basic block sequence buffer (BBSB) 42, a basic block cache (BBC) 44, and fetch logic 46. Elements referred to herein with a particular reference number followed by a letter may be collectively referred to by the reference number alone. For example, functional units 24A–24N may be collectively referred to as functional units 24.

Prefetch/predecode unit 12 is coupled to receive instructions from a main memory subsystem (not shown), and is further coupled to level one instruction cache 16 and branch prediction unit 14. Branch prediction unit 14 is coupled to instruction cache 16 and functional units 24A–N. Instruction cache 16 is further coupled to instruction alignment unit 18 and MROM unit 34. Instruction alignment unit 18 is in turn coupled to decode unit 20. Decode unit 20 and MROM unit 34 are coupled to each other and to BBSB 42, BBC 44, and multiplexer 40. Fetch logic 46, BBSB 42, and BBC 44 are each coupled together, while the output from BBC 44 is coupled to multiplexer 40, which is coupled to reorder buffer 32. Reorder buffer 32 is in turn coupled to register file 30, FPU 36, and reservation stations 22A–22N. Reservation stations 22A–22N are coupled to respective functional units 24A–24N, branch prediction unit 14, and a result bus 38. The result bus is also coupled to load/store unit 26, data cache 28, and register file 30. Data cache 28 is coupled to load/store unit 26 and to the main memory subsystem.

Level one instruction cache 16 is a high speed cache memory configured to store instruction bytes as they are received from main memory via prefetch/predecode unit 12. Instructions may be "prefetched" prior to the request thereof from instruction cache 16 in accordance with a prefetch scheme. A variety of prefetch schemes may be employed by prefetch/predecode unit 12 to store instruction bytes within instruction cache 16 before they are actually needed.

Prefetch/predecode unit 12 may also perform other task. For example, in one embodiment of prefetch/predecode unit 12, as instructions are transferred from main memory to instruction cache 16, prefetch/predecode unit 12 may be configured to generate three predecode bits for each byte of the instructions: a start bit, an end bit, and a functional bit. An asserted start bit corresponds to the first byte of an instruction. An asserted end bit corresponds to the lasts byte of an instruction. An asserted functional bit corresponds to an opcode byte within an instruction. These predecode bits may be stored in instruction 16 along with their corresponding instruction bytes. The predecode bits collectively form predecode "tags" indicative of the boundaries of each instruction. These predecode tags may be used by alignment unit 18, decode unit 20, and MROM unit 34 to speed the alignment and decoding process.

Instruction cache 16 may be configured to store up to 256 kilobytes of instructions in a 4-way set-associative structure having 32-byte cache lines. Alternatively, other associative or non-associative configurations and sizes may be employed for instruction cache 16, e.g., fully associative, 2-way associative, or direct mapped configurations having sizes of 128 or 64 kilobytes. If instruction cache 16 is configured in a set-associative manner, "way predictions" may be employed in order to speed access times. Instead of accessing tags identifying each line of instructions and then comparing the tags to the fetch address to select a way, way prediction entails predicting which way will be accessed. In this manner, the way is selected prior to accessing the instruction storage location. Thus, the access time of instruction cache 16 may be shorter, e.g., similar to a direct-mapped cache. A tag comparison is performed after the predicted way is output, and if the way prediction is incorrect, the correct instructions are fetched and the incorrect instructions are discarded.

As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align instructions for decode unit 20. In one embodiment, decode unit 20 comprises three independent instruction decoders, each capable of decoding one instruction per clock cycle. In this embodiment, instruction alignment unit 18 may be configured to align instructions from three sets of eight instruction bytes to the three parallel instruction decoders within decode unit 20. Instructions are selected independently from each set of eight instruction bytes into preliminary issue positions. The preliminary issue positions are then merged to a set of aligned issue positions corresponding to each decoder within decode unit 20, such that the aligned issue positions contain the three instructions which are prior to other instructions within the preliminary issue positions in program order. In this embodiment, the first decoder within decode unit 20 receives an instruction which is prior to (in program order) instructions concurrently received by the second and third instruction decoders within decode unit 20. Similarly, the second decoder within decode unit 20 receives an instruction which is prior to (in program order) the instruction concurrently received by the third decoder within decode unit 20. As previously noted, predecode information generated by predecode unit 12 and stored in instruction cache 16 may be used to speed the alignment process.

MROM unit 34 monitors the instructions, and when it detects an instruction that is too complex for decode unit 20, it replaces the instruction with a series of microcode instructions. The less complex instructions are decoded within decode unit 20. Decode unit 20 identifies the different fields within the instruction and expands the instruction into a predetermined internal format that is more convenient for functional units 24A–24N than the standard instruction format. Note that if microprocessor 10 is configured to execute only RISC instructions, alignment unit 18, MROM unit 34, and decode unit 20 may be greatly simplified or eliminated.

Decode unit 20 is configured to decode instructions received from instruction alignment unit 18. Register operand information is also detected and decoded. This information is routed to register file 30 and reorder buffer 32 via multiplexer 40. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. If decode units 20 detect a floating point instruction, the instruction is dispatched to FPU/MMX unit 36.

When decode unit 20 outputs the decoded instructions, this may be referred to as "dispatching" the instructions. When instructions are dispatched to reorder buffer 32, they are also copied in parallel into BBC 44. BBC 44 stores the decoded instructions with an address tag comprising all or part of the fetch address that fetched the decoded instructions. In one embodiment, BBC 44 is fully associative and uses the entire fetch address as the tag. In another embodiment, BBC 44 is set associative (e.g., 4-way) and uses portions of the fetch address as the tag. This involves splitting the address into the following three portions: (1) the index, (2) higher tag bits, and (3) lower TAG bits. The index bits (used to index into BBC 44) are bits selected from the middle of the fetch address. A tag comparison is performed for the higher and lower tag bits (offset). Thus, each basic block of instructions stored within BBC 44 has its own unique starting address and may be easily accessed.

BBSB 42 may be configured to have the same structure (e.g., addressing scheme) as BBC 44 and to receive the same fetch address information that BBC 44 receives from decode unit 20. However, instead of storing basic blocks, BBSB 42 is configured to store information about the corresponding basic blocks in BBC 44. For example, BBSB 42 may store predicted sequences of basic blocks and the addresses of all possible following basic blocks. It may also contain prediction information indicative of whether the corresponding branch instructions (that define the end of each basic block) will be taken or not taken. This prediction information may be used to select which basic block will be executed next.

In one embodiment, microprocessor 10 may employ branch prediction in order to speculatively fetch and or prefetch instructions subsequent to conditional branch instructions. Branch prediction unit 14 is included to perform such branch prediction operations. In one embodiment, branch prediction unit 14 is configured to store up to two branch target addresses for each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores only two targets per 16 byte portion of the cache line, predictions for some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e., instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 2, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction may be reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that FPU/MMX unit 36 may also be employed to accommodate floating point and multimedia operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set-associative structure. Similar to instruction cache 16, data cache 28 may employ a way prediction mechanism. It is understood that data cache 28 may be implemented in a variety of specific memory configurations.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Basic Block Sequence Buffer (BBSB) and Basic Block Cache (BBC)

Figure 3:
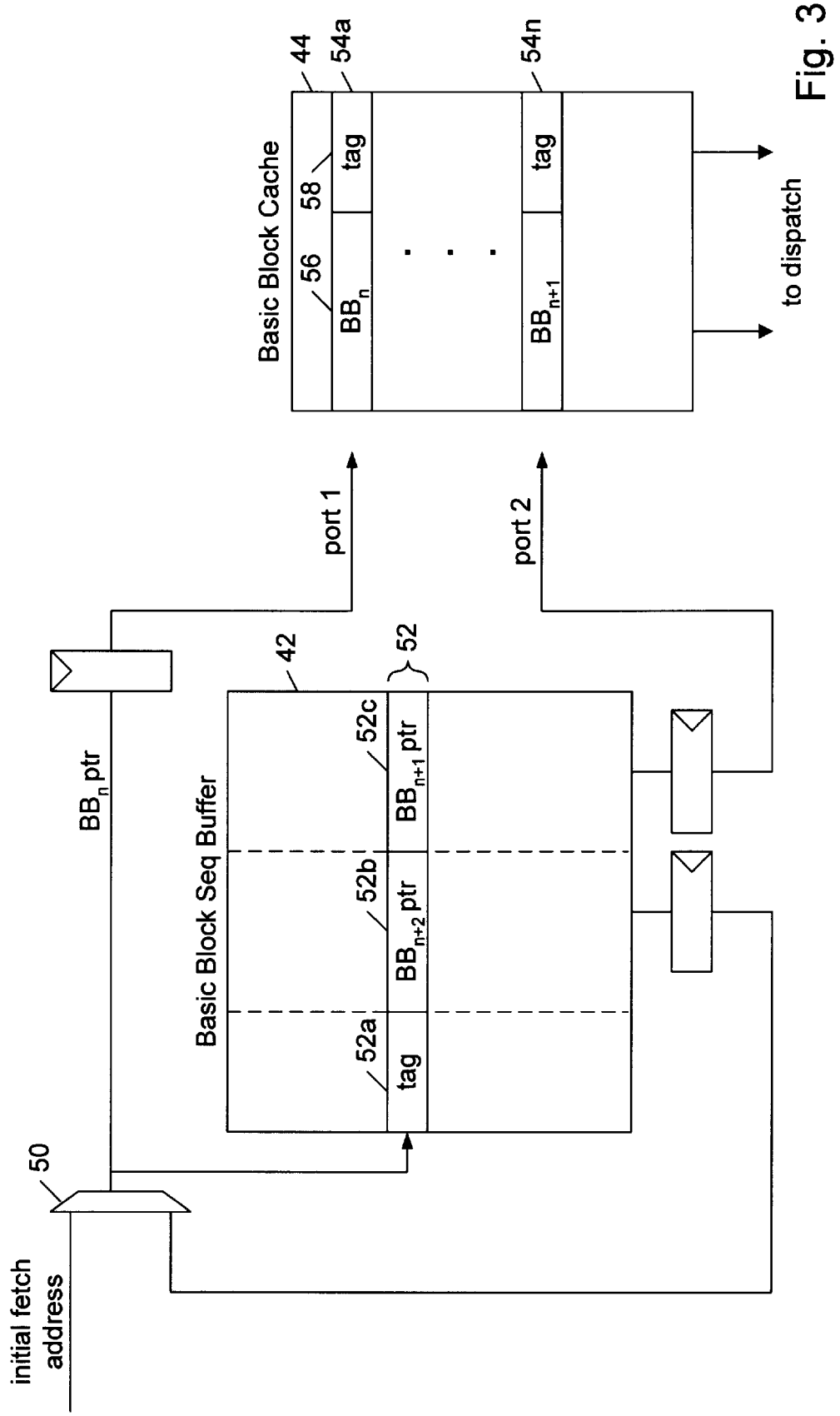
FIG. 3 is block diagram illustrating details of one embodiment of the basic block sequence buffer (BBSB) and basic block cache (BBC) from FIG. 2.

Turning now to FIG. 3, more details regarding the organization of one embodiment of BBSB 42 and BBC 44 are shown. BBSB 42 comprises a plurality of storage lines 52, each configured to store an address tag 52a, and two or more basic block pointers 52b–c. Similarly, BBC 44 also comprises a plurality of cache blocks 54a–n, each configured to store a basic block 56 and an address tag 58. Both BBSB 42 and BBC 44 are pipelined, with BBSB 42 being accessed in the pipeline stage before BBC 44 is accessed.

Generally, on an initial lookup a fetch address may be used to fetch the target basic block from BBC 44, as well as retrieve a set of pointers from BBSB 42. The pointers point to a number of subsequent predicted basic blocks that may be used for the next lookup in BBC 44. Each subsequent BBSB index is derived from information in the previous BBSB entry, as is each subsequent set of BBC indexes.

Fetch addresses are routed in parallel to both BBSB 42 and BBC 44. BBSB 42 uses the fetch address (or a portion thereof) to access a particular storage line by performing comparisons on tags 52a. Upon finding a match, BBSB outputs two pointers. The first pointer 52c (represented as BBn+1) corresponds to the basic block that is predicted to directly follow the fetch address (BBn). Pointer 52c is routed to BBC 42's second read port (port 2). The second pointer 52b (BBn+2) corresponds to the basic block that is predicted to follow pointer 52c. Pointer 52b is routed to multiplexer 50, which selects it as the new predicted fetch address for the next fetch cycle.

The next clock cycle, BBC 44 receives the fetch address in its first read port and pointer 52c in its second read port. During this clock cycle, BBC 44 outputs the corresponding basic blocks (e.g., BBn and BBn+1) based upon comparisons of tags 58. Thus, after one clock the output of BBC 44 may appear as indicated in Table 1.

TABLE 1

|  | Port 1 | Port 2 |
| --- | --- | --- |
| Cycle 1 | (none) | (none) |
| Cycle 2 | BBn | BBn + 1 |
| Cycle 3 | BBn + 2 | BBn + 3 |

Note, for simplicity the figure and the examples above show only two blocks fetched at a time. However, BBSB 42 and BBC 44 may be extended to accommodate additional blocks. Further note that the clock cycles indicated above may vary across different implementations.

Indexes for BBC 44 are derived directly from either the fetch address (e.g., on a branch misprediction), or from the BBSB prediction pointers. BBSB indexing can be performed in the same way, or the index may be modified, e.g., by a hashing algorithm. Using normal memory addresses to access BBC 44 allows cache coherency to be maintained. Details on index formation, BBSB entries, and coherency will be discussed in greater detail below.

The form of the pointers provided by BBSB 42 and the method of detecting hits in BBC 44 is subject to the same tradeoff as conventional branch prediction, where there are two basic approaches. The first approach is for the predictor to provide a full target address for the cache lookup. A normal cache tag comparison is then performed to determine if the block is in the cache. An alternate approach is to store only cache block addresses in the predictor array (i.e., a particular cache block is predicted to contain the proper target instructions), thereby greatly reducing the array size. The full address is formed from the block index and the cache tag, and then sent to functional units 24A–N for verification. Note that verification may be performed for either scheme. With this method a cache miss may not be detected until the branch in question is executed, hence there may be a tradeoff of less real estate versus greater delay in detecting cache misses.

Figure 4:
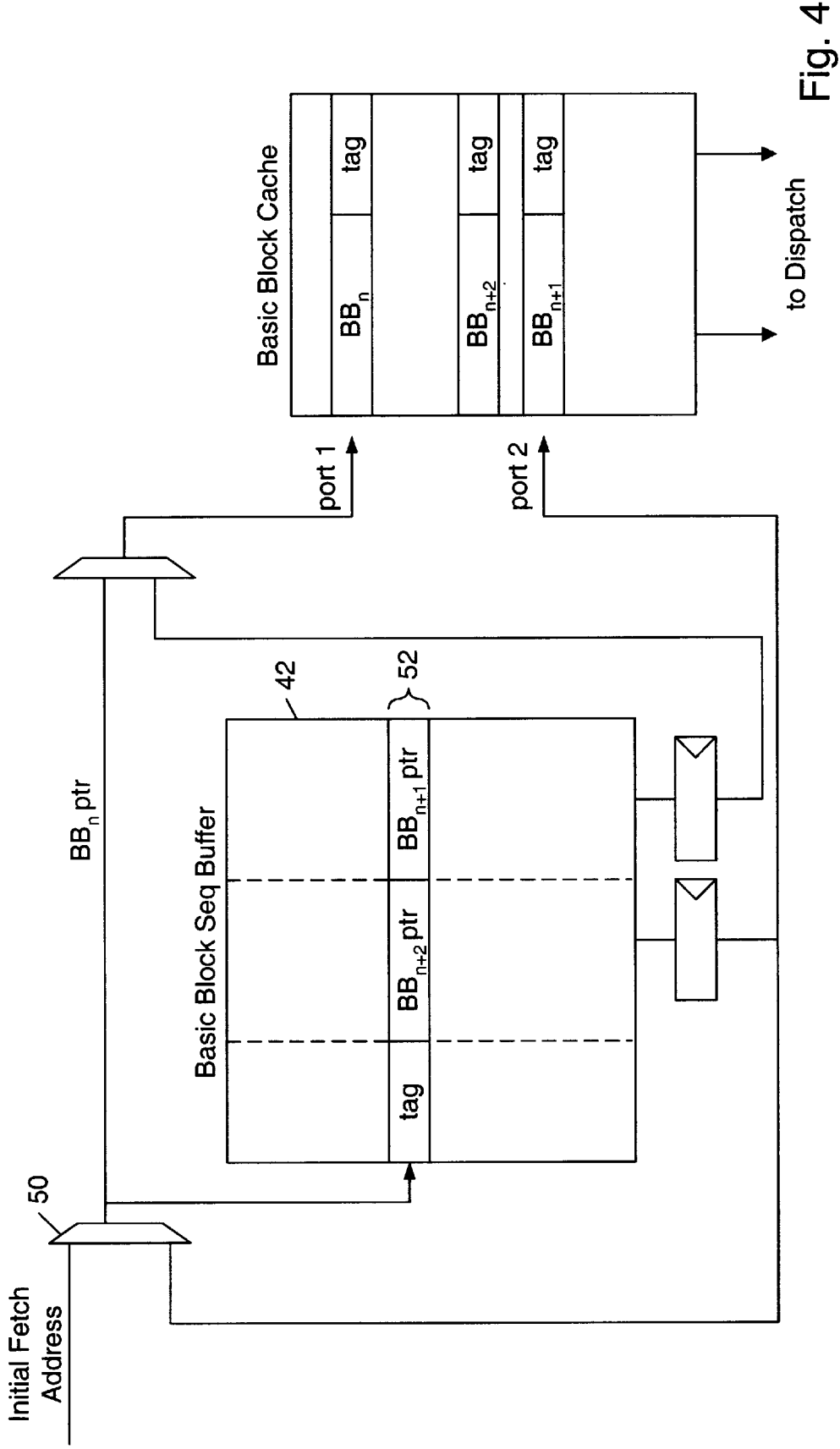
FIG. 4 is block diagram illustrating details of another embodiment of the BBSB and BBC from FIG. 2.

Turning now to FIG. 4, another embodiment of BBC 44 is shown. In this embodiment, BBSB 42 and BBC 44 are accessed in parallel with the fetch address during the same clock cycle. Since BBC 44 may output the corresponding basic block as soon as it is available (versus waiting a clock cycle as in the previous embodiment), the first basic block (BBn) may be available one clock cycle sooner. This is reflected in the output as indicated in Table 2.

TABLE 2

|  | Port 1 | Port 2 |
| --- | --- | --- |
| Cycle 1 | BBn | (null) |
| Cycle 2 | BBn + 1 | BBn + 2 |
| Cycle 3 | BBn + 3 | BBn + 4 |

One potential advantage of this embodiment is that the target block (and only that block) of a misprediction recovery may be available one cycle earlier than in the previous embodiment. However, this improved misprediction recovery may come at the expense of greater address loading (and hence tighter timing) in the first access cycle. Differences in how BBSB 42 and BBC 44 are indexed may affect various details of operation.

Other potential advantages may be evident in different embodiments. For example, the pipeline for this embodiment of microprocessor 10 may possibly be smaller than that of other microprocessors. In one embodiment, the main instruction fetch pipeline of microprocessor 10 may comprise the following stages: (1) BBSB 42 lookup; (2) BBC 44 lookup; (3) reorder buffer lookup and allocation; (4) execution; (5) write back of results upon result bus 38; and (6) retiring instructions. Since the instructions may already be aligned and decoded when they are read from BBC 44, additional stages that are typically present in other microprocessors may not be necessary. Furthermore, in the case of a branch misprediction (which may be discovered during the execution stage), the penalty may be reduced if the correct branch target is stored in BBC 44.

Another potential advantage may occur when a branch instruction between two basic blocks is correctly predicted. In this case, the current basic block and the predicted basic block may be fetched in a single clock cycle. As previously noted, in other embodiments, even more basic blocks might be dispatched in parallel (e.g., three or four blocks). The number of dispatched basic blocks may be limited by the size of BBSB 42 or the number BBC 44's read ports. Another limitation may be the branch prediction accuracy. Beyond a certain limit, the basic blocks at the end of the sequence may have a high likelihood of being mispredicted. Note, however, that the potential advantages discussed herein may depend to a large extent upon the exact implementation of microprocessor 10.

Another embodiment of microprocessor 10 may be configured to improve the speed of reorder buffer 32 look ups (i.e., dependency checking). Within each basic block, all register data dependencies are likely to remain constant. Thus, once the dependencies for a particular basic block are determined (e.g., during the initial decoding phase), this information may be stored together with the basic block in BBC 44. Upon subsequent fetches of the basic block from BBC 44, that dependency information may be used to speedup reorder buffer lookup and allocation.

Pipeline Stages

Figure 5:
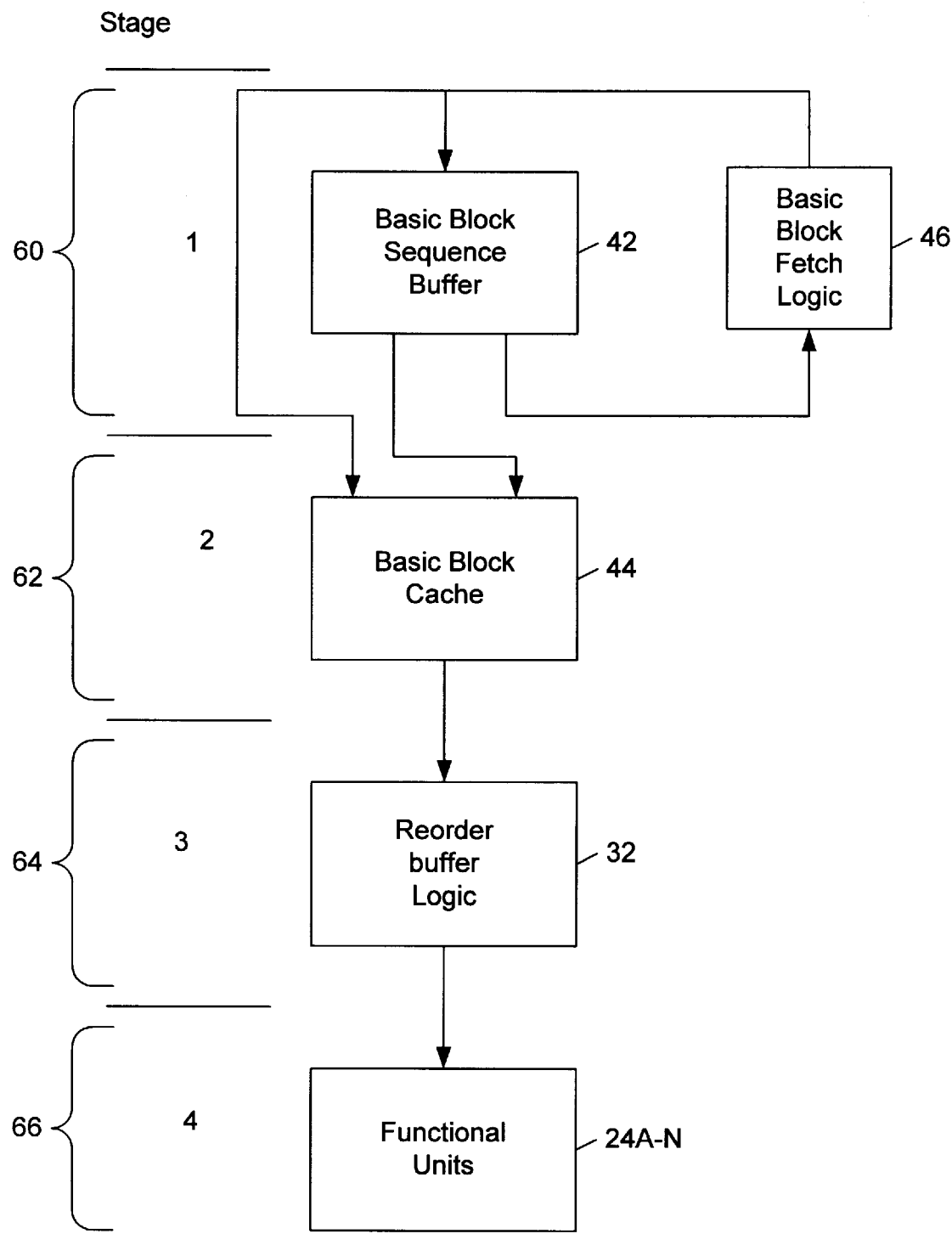
FIG. 5 is a diagram illustrating one embodiment of potential pipeline stages within the microprocessor of FIG. 2.

Turning now to FIG. 5, a high-level block diagram of the pipeline stages within one embodiment of microprocessor 10 (e.g., the embodiment from FIG. 3) is shown. In this embodiment, the first pipeline stage 60 comprises the operation of BBSB 42 and basic block fetch logic 46. The second pipeline stage comprises the accessing of BBC 44. The third pipeline stage comprises the operation of reorder buffer logic 32, while the fourth pipeline stage 66 comprises the operation of functional units 24A–N. The upper stages of the pipeline, which are used to load BBSB 42 and BBC 44 in case of a cache miss, are not shown in the figure. They will be discussed in a separate section below.

Figures 6, 7:
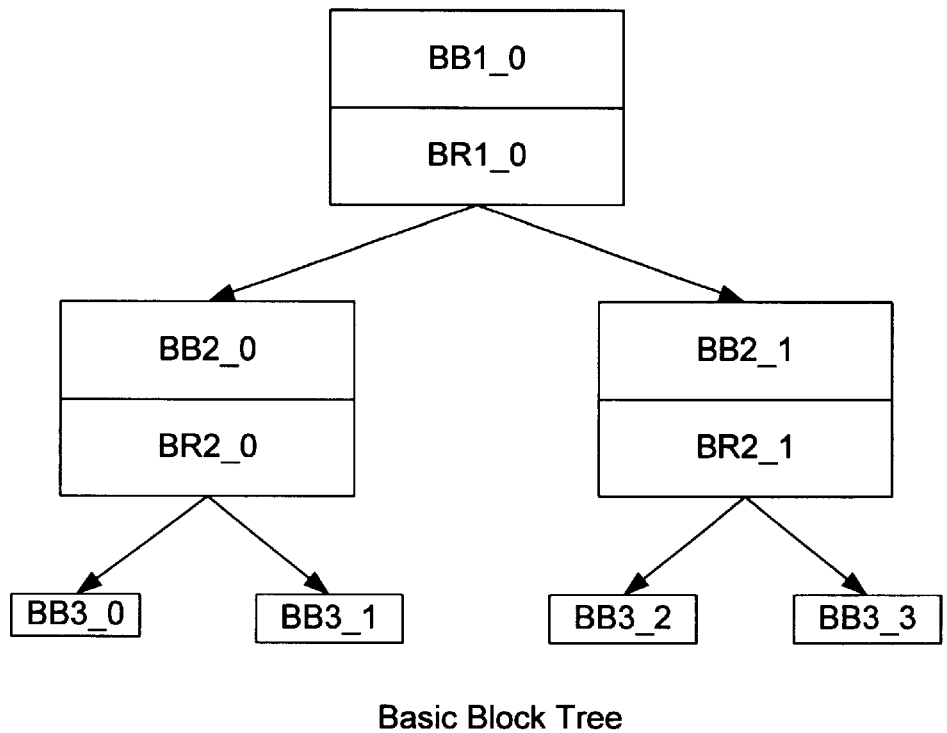
FIG. 6 is a diagram illustrating one embodiment of a basic block tree showing the possible paths from a single basic block.
FIG. 7 is a table illustrating one embodiment of a sequence of accesses or basic blocks.

Turning now to FIG. 6, a basic block tree showing the possible paths from a single basic block are shown. In the figure, blocks BBx are basic blocks and blocks BRx represent their corresponding branches. As can be seen in the figure, BB1-0 is the basic block addressed by the lookup tags stored in BBSB 42. Thus, the BBSB entry that corresponds to BB1_0 contains pointers to all of the basic blocks shown in the figure (i.e., BB2_0, BB2_1, BB3_0, BB3_1, BB3_2, and BB3_3). Either BB2_0 or BB2_1 follows BB1_0. While BB3_0 to BB3_3 are not required for the current lookup, they are required to lookup the next set of basic blocks. For each branch instruction a predictor is also required in addition to the two possible basic block addresses. The predictor serves to determine the most likely path. Therefore, three predictors are required for the basic block tree in the figure, i.e., one to predict each of BR1_O, BR2_0, and BR2_1.

BB1_0 is the first basic block in the current set of basic blocks. Its address can be sent immediately to BBC 44 for lookup. The selected BBSB entry then delivers the address of BB2_x, which is then asserted to BBC 44 for the lookup of the second basic block. The address of BB3_x is used as the lookup address in the next cycle for the next set of basic blocks, like BB1-0 in the current cycle. So the lookup for a set of basic blocks uses the basic block address of the starting basic block.

Turning now to FIG. 7, a table is shown that illustrates one embodiment of the sequence of accesses for basic blocks. In the table, the address "n" represents the start of a new basic block sequence. Column 70 represents the current clock cycle. Column 72 represents the input address to BBSB 42. Column 74 represents the address output by BBSB 42 in a given clock cycle. Column 76 represents the addresses received at the input ports of BBC 44, and column 78 represents the basic block output by BBC 44 during the given clock cycle. Note that the timing herein is meant to be exemplary only, and that the timing may change according to specific implementations and the access times of BBSB 42 and BBC 44.

Basic Block Addressing

This section describes one possible method for addressing a line within BBSB 42. Depending upon the implementation, BBSB 42 may be addressed with either physical or linear addresses. In some embodiments, the addressing of BBSB 42 may differ from that of a regular cache. For example, a regular cache may have a fixed line size, e.g., 32 bytes. Thus, the index into the cache addresses 32 byte multiples. Accordingly, the index used to access the cache is the upper portion of the address less the offset. In this way, two sequential lines may each start with an offset of zero, but with an index which differs by one.

In contrast, each line within BBSB 42 corresponds to a basic block stored in BBC 44. Each line in BBSB 42 is accessed using the address of the corresponding basic block. However, since each basic block may have a different length (due to the variable-length nature of the x86 instruction set), there is no constant granularity or spacing between the starting addresses of sequential basic blocks. Thus, two factors may complicate the addressing of lines within BBSB 42. First, each basic block may not have a fixed byte size. The byte size of a basic block varies with the number of instructions and the length of the instructions. Second, each basic block may not necessarily start with an offset of zero, i.e., a basic block may start at any address.

Figure 8:
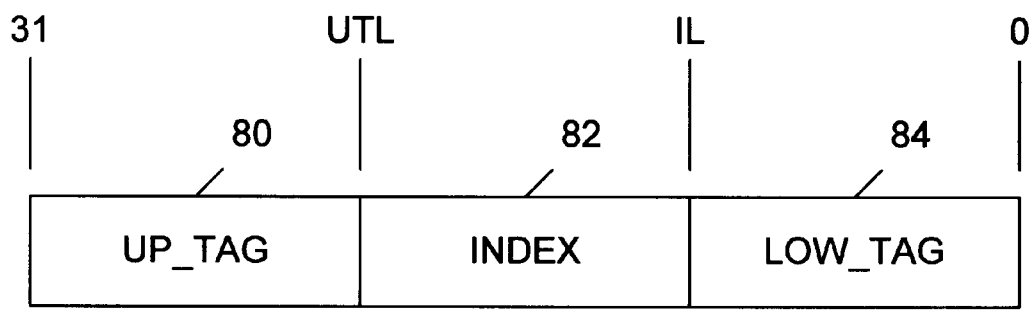
FIG. 8 is a diagram depicting an exemplary address scheme for the BBSB of FIG. 2.

Turning now to FIG. 8, an exemplary address scheme for BBSB 42 is shown. Index field 82 is used to index into BBSB 42. An UP_TAG field 80 stores a tag comprising the bits between the upper tag limit (UTL) and bit 31. A LOW_TAG field 84 stores a lower tag which is used to compare the offset of a basic block within a given range. The lower tag starts at bit 0 and continues up to the index limit (IL) bit minus one (i.e., bit IL−1). The size of LOW_TAG field 84 and the associativity within BBSB 42 depend on the variations of the length of an individual basic block. This is discussed in greater detail below.

Figure 9:
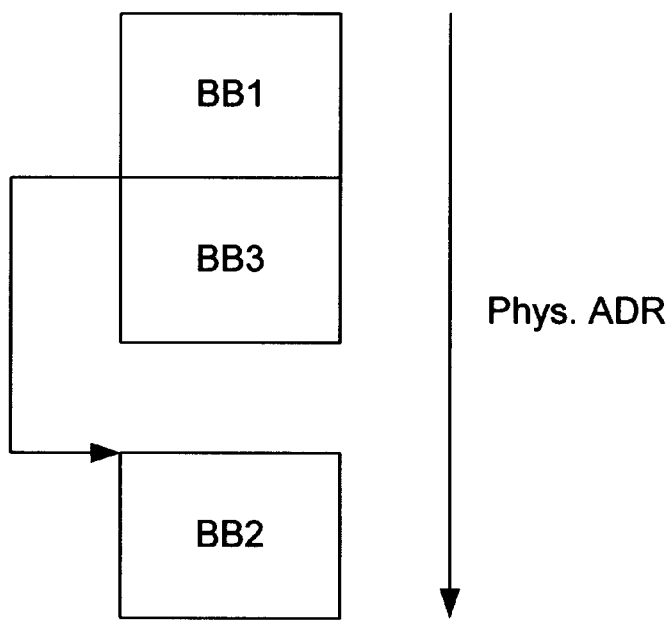
FIG. 9 is an illustration of one embodiment of a sequence of basic blocks.

Turning now to FIG. 9, an illustration of a sequence of basic blocks is shown. As the figure illustrates, two sequential basic blocks in physical address space (e.g., BB1 and BB3) may each need separate entries within BBSB 42. Thus, the minimum distance between two entries in BBSB 42 is one basic block length. Each basic block's length is determined by the number of instructions in the basic block and their particular length.

Assuming that the average instruction length is two to three bytes and that the average length of a basic block is three to four instructions, then the average length of a basic block is six to twelve bytes. In order to use a different entry for sequential basic blocks (as shown in the figure), the index may increment the address in eight byte units. Thus, one exemplary size for LOW_TAG field 84 is three bits.

Some basic blocks may be longer than the assumed average of eight bytes. This may cause some basic blocks to extend across indexes. Other basic blocks may be shorter than the assumed average of eight bytes. This may result in some basic blocks to have the same index. A number of different configurations of BBSB 42 may be used to resolve this issue.

In one embodiment of BBSB 42, LOW_TAG field 84 may be decreased in size (e.g., two bits), thereby providing greater index resolution. However, this may result in inefficiencies as a greater number of indexes may be unused.

Another embodiment of BBSB 42 may be configured to be set associative. Thus, in the event of short basic blocks (e.g., shorter than the eight byte length in the example above) with two or more basic blocks sharing the same index, BBSB 42 may be configured to allocate two different columns (or "ways") within the same set for the two basic blocks. Thus, the two entries will share the same UP_TAG and index, but they will have different LOW_TAG's (which may be used to select the correct column or way). For basic blocks having lengths greater than or equal to the average length, additional "sets" may be used for entries with different UP_TAG's. A set (also referred to as a row) comprises all the storage locations into which data with a particular address tag may be stored. For example, in a four-way set associative configuration, data corresponding to a particular tag may be stored in one of four different locations (i.e., one location in each way matches the particular tag). These four locations make up the set or row.

Figures 10A, 10B:
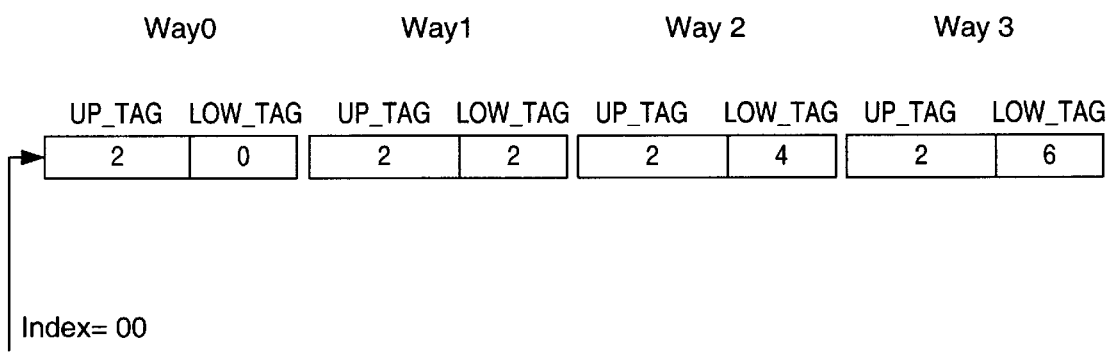
FIG. 10A is a table of sample addresses from a basic block sequence.
FIG. 10B is a diagram illustrating one possible method for storing information about basic blocks.

Turning now to FIG. 10A, a table of sample addresses of a basic block sequence is shown. The sample addresses illustrate a number of short (i.e., two byte) sequential basic blocks. One possible method for storing information about these basic blocks is illustrated in FIG. 10B. The figure shows the basic block information stored in a four-way set associative embodiment of BBSB 42. As the figure illustrates, the first basic block in the sequence is stored in way 0, the second basic block in way 1, the third basic block in way 2, and the fourth basic block in way 3. The set is selected by the index portion of the address of each basic block, in this case 00.

Thus, for both cases a set associative configuration for BBSB 43 may provide the desired functionality. The number of ways may be determined by the ratio of the average basic block length versus the assumed minimum basic block length. This formula may be represented as follows: (Number of ways)=(Average basic block length)/(Minimum basic block length). In the examples above, an associatively of four ways was used. This would yield a minimum length for basic blocks of two bytes. Any basic blocks shorter than two bytes may result in undesired replacements (discussed in greater detail below). Larger associativity may yield more flexibility, but may also require more hardware. Note that this formula is merely meant to be exemplary and that other ratios for determining the set associativity of BBSB 42 may be used. Furthermore, as previously noted BBSB 42 may also function properly in a non-set associative configuration. In addition, while a LOW_TAG size of three bits and four way set-associatively are used throughout the examples herein, other configurations are also contemplated.

Basic Block Sequence Buffer (BBSB) Line Structure

Each line of BBSB 42 may contain information about a particular basic block sequence. As previously discussed, a sequence of two basic blocks may result in the storage of six basic block addresses and prediction information for three branches. In one embodiment, BBSB 42 stores full 32-bit addresses fore each of the basic blocks. Thus an exemplary storage line within BBSB 42 may contain the fields illustrated in FIG. 11.

In the embodiment shown, fields BB2_ADR and BB3_ADR (90) store the two possible addresses for the second basic block (i.e., a taken address and a not-taken address). Fields BB2_1_ADR through BB3_2_ADR (92) store the four possible addresses for the first basic block of the next clock. Fields PBR1 through PBR3 (94) store the predictors for the 3 branches. A status field (96) stores line validation information and a number of bits (e.g., one for each of the six basic block address fields) to determine which stored basic block addresses are valid. A replacement field (98) stores least-recently used ("LRU") or pseudo LRU bits to determine which way within a line should be replaced first. Note that other replacement algorithms may also be used. In addition, note that the fields listed are for explanatory purposes and that other combinations of fields may be used. For example, the number of stored basic block addresses may be increased.

Operation of BBSB

The index bits of the fetch address are used to index into BBSB 42. Of the set matching the fetch address' index field, a storage location (or line) within the set will be a valid match only if both the upper and lower tag bits match the address. If the desired line is not stored in BBSB 42, then the requested instructions may be fetched from instruction cache 16 and decoded by decode unit 20. The fetch address may also be immediately forwarded to BBC 44, because the fetch address may be used to access the first basic block (as previously described in FIGS. 3 and 4).

Figures 11, 12:
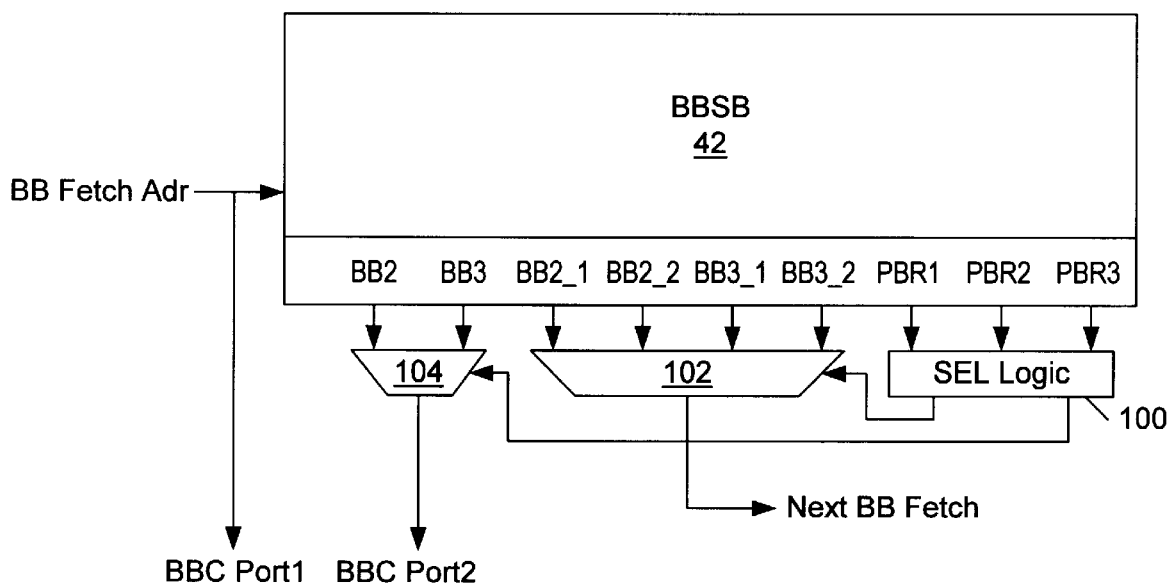
FIG. 11 illustrates one embodiment of an exemplary storage line within the BBSB of FIG. 2.
FIG. 12 illustrates another embodiment of the BBSB from FIG. 2.

If BBSB 42 contains the desired entry, then the entry provides the information illustrated in FIG. 11. The three predictors (field 94) may now be used to select the addresses of the two following basic blocks (BB2–BB3 and BB2_1–BB3_2). The address of the first basic block (BB2 or BB3) is sent to BBC 44 to fetch the second basic block. The address of the third basic block (either BB2-1, BB2-2, BB3-1, or BB3-2) is used to fetch a new basic block in the next cycle. Thus, the output for the third basic block address is used as the next block fetch address in the next cycle. Replacement information (e.g., field 98) may also be updated during that process.

One embodiment of BBSB 42 configured to perform in this manner is shown in FIG. 12. In this embodiment, BBSB 42 comprises selection logic 100 and two multiplexers 102–104. Selection logic 100 is configured to cause multiplexer 102 to select one of the predicted basic block addresses from field 92 based upon the prediction information stored in field 94. This address may be routed back to one of BBSB 42's inputs for use as a fetch address during the next cycle. Selection logic 100 is also configured to cause multiplexer 104 to select one of the basic block addresses from field 90.

In the next clock cycle, the cycle is repeated using the basic block address from multiplexer 104 as the fetch address. This sequence continues until one of the following conditions is met: (1) a miss occurs in BBSB 42, (2) a basic block branch misprediction occurs, or (3) a miss occurs in BBC 44. Potential responses for each of these cases are discussed further below.

Basic Branch Prediction

The prediction mechanism used by BBSB 42 is not limited to any particular algorithm and may be implementation dependent. However, in some embodiments the basic branch prediction used in BBSB 42 is a "global" prediction method. This means that the same branch might occur in different sequences or "runs" within different entries in BBSB 42. However, the predictor is only updated for the corresponding basic block sequence. Thus multiple predictor values may exist for a particular branch instruction. Another embodiment of BBSB 42 that is capable of "local" prediction will be described further below.

Basic Block Cache

In one embodiment, BBC 44 contains instructions which are already aligned and decoded for functional units 24A–N. As previously noted, in one embodiment BBC 44 is configured to store basic blocks that contain up to four instructions each. BBC may be configured to have cache lines that have lengths equal to the maximum basic block length. As noted in connection with FIGS. 3 and 4, BBC 44 may be configured with multiple read ports to allow multiple basic blocks to be looked up in parallel. The number of instructions output per clock cycle may vary according to the number of instructions per basic block and the number of read ports. For example, in one embodiment BBC 44 may be configured to output two basic blocks per clock cycle with each basic block having up to four instructions. Thus, in this embodiment BBC 44 may dispatch up to eight instructions per clock cycle.

Each of the eight instructions may be assigned to a specific functional unit 24A–N. In one embodiment of microprocessor 10, there are eight symmetrical functional units, thus no additional multiplexing may be needed. An example of this configuration is shown in FIG. 13. As the figure illustrates, in this embodiment the first instruction in the basic block output by BBC 44's first read port is always routed directly to functional unit 24A.

In some embodiments, the organization (and addressing scheme) of BBC 44 may be identical to the organization of BBSB 42. This may be advantageous because both BBSB 42 and BBC 44 work with basic blocks as entities. Therefore, the same design optimizations may benefit both structures. For example, both BBSB 42 and BBC 44 may be configured as four-way set associative structures. In another embodiment, both BBSB 42 and BBC 44 may be organized as fully associative caches.

Structure of Basic Blocks

In one embodiment, the basic blocks stored within BBC 44 are limited to no more than four decoded instructions. The basic blocks may be formed by decode unit 20 from decoded instructions that are sent to multiplexer 40. If a basic block is less than four instructions long, it may be padded with "NULL" instructions until it is four instructions long. NULL instructions are instructions which cause no operations to be performed. Thus, NULL instructions are similar to standard NOP (no operation) instructions, which may, however, increment the PC (program counter). Basic blocks that are longer than four instructions may be broken into two or more basic blocks, each having a length of four decoded instructions. The first basic block in the sequence is simply linked to the next basic block in the sequence through the corresponding prediction information stored in BBSB 42. This is described in greater detail below.

BBC Line Structure

Depending upon the implementation, each cache line within BBC 44 may have a number of different configurations. In one embodiment, each cache line may contain slots for four instructions. Space may also be allocated for other information, e.g., valid bits for each instruction and a replacement field for storing replacement information.

Turning now to FIG. 14, a table detailing one embodiment of a cache line within BBC 44 is shown. Fields INS1–INS4 (110) each store one aligned instruction. The maximum width of the instructions may vary across different implementations. INS fields 110 may contain normal instructions, partially decoded or predecoded instructions, or even fully decoded instructions. Additional information, e.g., dependency information, may be stored to speed up the operation of reorder buffer 32.

I_Valid field 112 may store an indication as the whether the associated instruction is valid or invalid. If the instruction is valid, reorder buffer 32 dispatches the instruction. Otherwise a NULL instruction is generated for that slot. If all I_Valid bits are zero, then the line is not valid. Replacement field 114 may store LRU or Pseudo LRU (other replacement algorithms may also be used) information to determine which way within a line should be replaced first.

As previously noted, BBC 44 may have multiple read ports. Thus, each instruction may have more than one possible destination functional unit, depending on which port the instruction is output through. Note, in other embodiments functional units 24A–N may have reservations stations 22A–N configured to store multiple instructions pending execution. In still other embodiments, a "central window" might be used for storing the instructions pending execution. Using a central window the instructions may be routed to specialized functional units that may not be symmetrical. In still other embodiments, reorder buffer 32 may route instructions according their functional requirements, e.g., load and store instructions to load/store unit 26.

BBC Operation

Every clock cycle, two parallel lookups (assuming BBC 44 has dual read ports) are executed for two different basic blocks. For each port, the lookup process may be the same. When BBC 44 is accessed, the index bits from the fetch address are used to index into BBC 44. A line within the set selected by the index is only considered a valid match if both the upper and lower tag bits match the fetch address. If the requested line is not in BBC 44, then the requested instructions must be fetched from instruction cache 16 and decoded.

If BBC 44 contains the requested line, then the basic block is sent to reorder buffer 32, along with the line's associated valid bits (field 112). Reorder buffer 32 may be configured to ignore invalid instructions from BBC 44. Instead, the invalid instructions may be converted into NULL instructions. This may occur, for example, if a basic block has fewer than the predetermined maximum number of instructions per basic block. This case is discussed in further detail below.

Short and Long Basic Blocks

There are two special cases for basic storage. The first is when a BBC entry is only partially used (i.e., a "short basic block") and another, where the basic block uses multiple BBC entries (i.e., a "long basic block").

As mentioned above, each instruction from BBC 44 is marked either as valid or invalid. This marking may serve as an indicator for short basic blocks. A short basic block (three instructions in length) is shown below:

1 INS1
2 INS2
3 JMP xxx

Figures 15, 16:
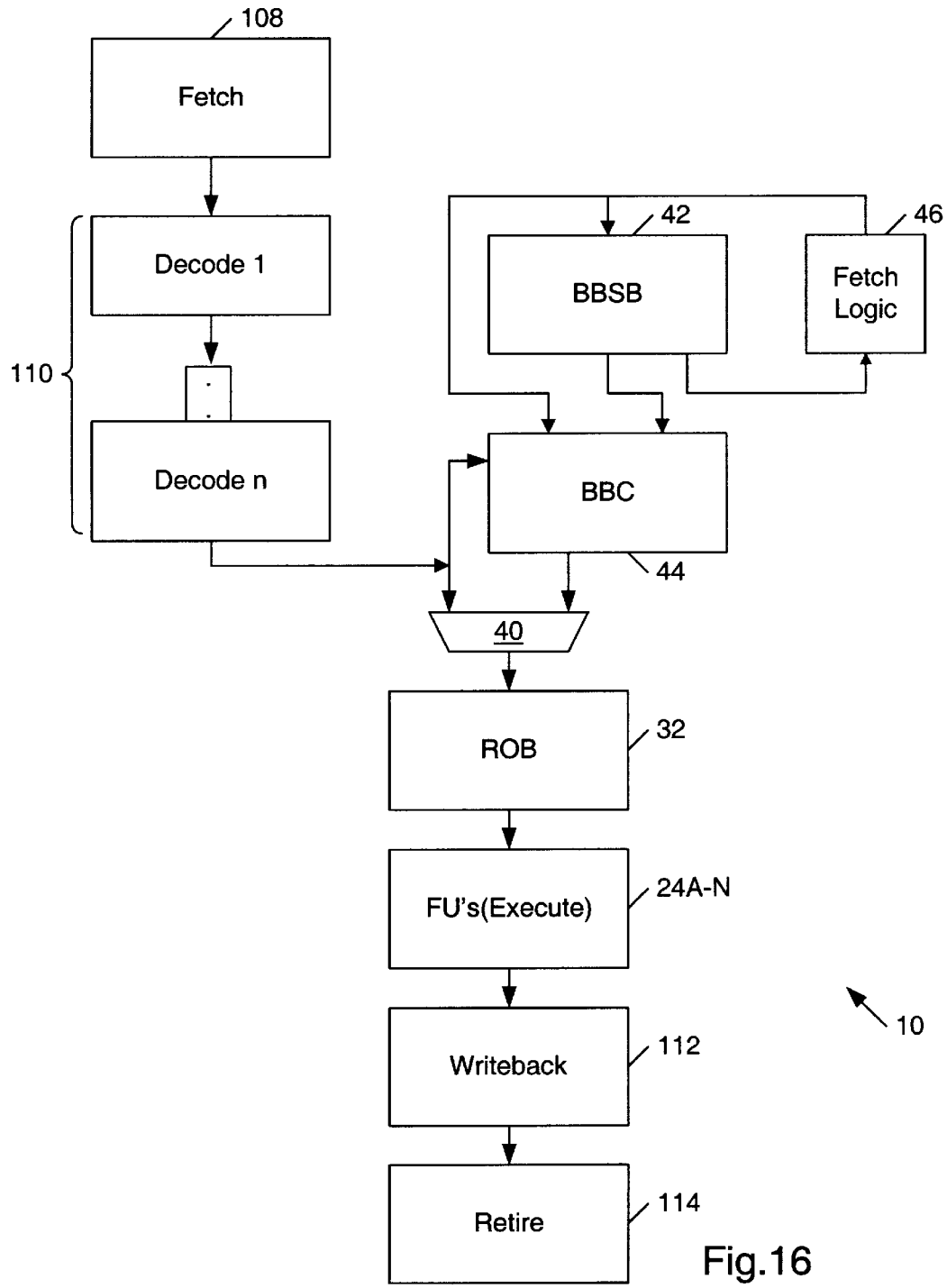
FIG. 15 is a diagram of an exemplary sequence of instructions.
FIG. 16 is a diagram of the operational pipeline of another embodiment of the microprocessor from FIG. 2.

Turning now to FIG. 15, an exemplary sequence of instructions from which the above short block was taken is illustrated. The third instruction is a jump instruction and therefore marks the end of the basic block. Since there is not a valid fourth instruction, the fourth instruction storage location associated with the basic block is marked as invalid. As noted above, if reorder buffer 32 is configured to perform fixed assignment of instructions to functional units 24A–N (see FIG. 13), then one or more of functional units 24A–N may execute NULL instructions (i.e., effectively sit idle). Thus, each time the following equation is true, the functional units may not be completely utilized: (number of instructions in basic block) mod 4 !=0. Thus, there may be a tradeoff between efficiency and faster design (i.e., higher clock rates versus less pipeline stages) due to the fixed assignment.

In the example embodiments described herein, basic blocks are considered to be "long" when they have more than four instructions and therefore span more than one entry. Long basic blocks may be broken into a series of smaller component basic blocks. The component basic blocks are linked by pointers stored in BBSB 42.

Functional Examples

This section includes examples of several methods for operating BBSB 42 and BBC 44 in response to different events. The list of possible scenarios includes: (1) normal operation (i.e., both BBSB 42 and BBC 44 hit, with correct branch predictions); (2) a BBSB 42 miss occurs; (3) a BBC 44 miss occurs; or (4) a branch misprediction occurs.

Turning now to FIG. 16, a diagram of the operational pipeline of another embodiment of microprocessor 10 is shown. As the figure illustrates, after a fetch (block 108) instruction cache 16 conveys instructions to decode unit 20. Note multiple clock cycles may be required to complete decoding (block 110). The decoded instructions (possibly in basic block form) are then conveyed to BBC 44 and multiplexer 40. Multiplexer 40 routes the basic blocks to reorder buffer 32, which may be configured to perform dependency checking. Reorder buffer 32 dispatches the instructions to functional units 24A–N (or reservation stations 22A–N) which execute the instructions and write back the results (block 112) to reorder buffer 32. Finally, reorder buffer 32 retires the instructions by writing the results (block 114) to register file 30.

At the end of the decode stages (block 110), the basic blocks have been identified and properly aligned by decode unit 20. Thus, the first basic block starts at instruction position one, and the second basic block starts at instruction position four (assuming fixed basic block lengths of four instructions). From there, the basic blocks go to the reorder buffer 32 and may also be written into BBC 44. Multiplexer 40 selects the output from either BBC 44 or decode unit 20 as an input for reorder buffer 32.

Normal Operation

During normal operation, the required basic blocks are already stored in BBC 44, and the proper sequence information is already stored in the BBSB 42. Thus, accesses to BBC 44 and BBSB 42 both result in hits. During normal operation the basic block predictions are correct. Due to the pipelined nature of microprocessor 10, the operational stages may perform their tasks in parallel. Each stage is outlined below.

Stage 1—BBSB Lookup

The speculative program counter (PC) points to the next basic block, thus the PC is directly forwarded to Port 1 of BBC 44. BBSB 42 is looked up with the PC value and in this case hits in BBSB 42. Thus, in the next clock cycle BBSB 42 may output the addresses of the second and third basic blocks. The second basic block address is conveyed to the second read port of BBC 44, while the third basic block address is used as the address of the next (speculative) PC. At the end of the clock, the replacement information for BBSB 44 may also be updated.

Stage 2—BBC Lookup

BBC 44 accesses and attempts to output cache lines corresponding to the two addresses from both ports. Assuming both addresses hit in BBC 44, the following information is provided to reorder buffer 32: basic block 1 (instructions 1–4), basic block 2 (instructions 1–4), the valid bits for each instruction in each basic block, and possibly additional predecode and reorder buffer (i.e., dependency) information. At the end of the clock cycle, the replacement information within BBC 44 may also be updated.

In parallel with the BBC accesses above, the functions in stage 1 execute. Thus, BBSB 42 is looked up with the predicted address of the third basic block from above.

Stage 3—Reorder Buffer (ROB) Operation

In this stage, reorder buffer 32 receives and processes the eight instructions from basic blocks 1 and 2. In one embodiment, all reorder buffer operations (e.g., allocating an entry, dependency checking, etc.) may be performed in that clock cycle. As previously noted, the valid bits mark which instructions are valid. Valid instructions are processed normally, while others are converted to NULL instructions.

Stage 4—Execute

In this stage, a set of instructions may be dispatched from reorder buffer 32 to functional units 24A–C. In one embodiment, each reorder buffer slot may have a corresponding functional unit (see FIG. 13). Thus, no multiplexing or busses may be needed. If reservation stations 22A–N are empty, then the instructions may begin (and possibly complete) execution in that stage. In this stage, branch information may be routed back to BBSB 44 and branch prediction unit 14 to update the corresponding prediction information.

Stage 5—Writeback

In this stage, the results are put on result bus 38 (see FIG. 1) so that reorder buffer 32 may store them.

Stage 6—Retire

In this stage, reorder buffer 32 retires instructions by copying their results into register file 30. This updates the architectural (non-speculative) state of microprocessor 10. Note, the stages outlined above illustrate only one of many possible methods of operation for BBC 44. Further note the above sequence assumes that all cache accesses hit and that BBSB 42 correctly predicted the next basic block sequence.

BBSB Miss

If instead an access to BBSB 42 misses, a recovery process may be used. One embodiment of such a recovery process is described below.

Initially, the speculative program counter (PC) points to the next basic block. The PC is directly forwarded to Port 1 of BBC 44. Next, BBSB 42 is indexed with the PC value. In one embodiment, BBSB 42 is loaded with the required information as outlined in the following paragraphs:

(a) Level one instruction cache 16 is indexed using the PC. Assuming instruction cache 16 generates a hit, the instructions may be fed directly to decode unit 20.

(b) As previously noted, BBSB 42 and BBC 44 may be configured to handle two basic blocks at once. In this embodiment, up to eight instructions may be decoded at once. It is unclear at the fetch stage whether the two basic blocks actually span eight instructions or less. Furthermore, it is also unclear whether the second basic block is sequential to the first basic block (due to the absence of an accurate predictor). Therefore, it is assumed that the two basic blocks are sequential. In parallel with the fetch, the instructions step through the align and decode stages (in decode unit 20).

(c) At the end of the decoder pipe, the basic blocks have been identified and properly aligned. Thus, the first basic block starts at the first instruction position and the second basic block starts at the fifth instruction position. Decode unit 20 may also provide information indicating whether or not the basic blocks are in fact sequential. Note, the second basic block may be highly speculative in nature. Once aligned and decoded, the two basic blocks may be handled similar to the normal operation case. For example, the blocks may be conveyed to reorder buffer 32. From there, the blocks may step through the final parts of the pipeline, i.e., execution in functional units 24A–N, write back 112, and then retirement 114. In addition, the two basic blocks may also be stored into BBC 44. The instruction valid bits and replacement information may also be stored/updated.

(d) In parallel, an entry in BBSB 42 is generated. The entry is addressed with the address of the first basic block. Other information is speculatively filled in for the second basic block and following basic block or blocks, depending upon the implementation. Once again, the replacement info may also be updated.

(e) In one embodiment, fetch logic 46, coupled to decode unit 20, BBSB 42, and BBC 44, may determine whether the first and second basic blocks are sequential (by monitoring decode unit 20's output). If they are sequential, then fetch logic 46 may predict the third basic block and look up the third basic block in BBSB 42. Once again, it is assumed that a hit occurs and then the sequence starts with the regular operation sequence.

Alternatively, if the two basic blocks are not sequential, then fetch logic 46 may wait for the outcome of the first branch. It may then take the resulting address and access BBC 44 with it. If the basic block is in BBC 44, its four instructions are sent to reorder buffer 32. If the basic block is not in BBC 44, instruction cache 16 is once again accessed. This time, however, the access is only for four instructions, which are decoded and handled as described above. Once decoded, the instructions are sent to reorder buffer 32 and are also written into BBC 44. Thus, for both cases the entries in BBSB 42 are updated to reflect the outcome of the branch. Note, however, that any mispredicted instructions may also need to be cleared from reorder buffer 32.

(f) The predictor for the third basic block is now used to access BBSB 42 again. Here it is once again assumed that a hit occurs and that the sequence starts with the normal operation sequence.

BBC Miss

In the event that an access to BBC 44 results in a miss, the access to BBSB 42 may still hit (if not, the situation described above may apply). One possible method for recovering from a BBC miss is described in detail in the following paragraphs, which assume that a miss occurs for at least one lookup address in BBC 44.

When a miss occurs, instruction cache 16 may be looked up with the missed address from BBSB 42. The missed address may be either from the first basic block or the second basic block. If both basic blocks miss, then the first basic block may be fetched first. Assuming the missing address hits in instruction cache 16, the instructions may be directly fed to decode unit 20.

If the first basic block was a hit and the second basic block address missed, then the first basic block may be immediately conveyed from BBC 44 to reorder buffer 32. From there, the first basic block steps through the final parts of the pipeline (i.e., execution, write back, and retire). The second basic block may follow one pipeline stage behind the first basic block through the execution pipeline.

Regardless of which basic block missed, the decoded basic block from decode unit 20 is immediately conveyed to reorder buffer 32. From there, the instructions step through the final parts of the pipeline (i.e., execution, write back, and retire). In addition, the missing basic block(s) may also be stored into BBC 44. This may include the instruction valid bits. In addition, the replacement information may also be updated.

In one embodiment, self-modifying code may be prohibited to allow different handling of BBSB and BBC misses. If self-modifying code is allowed, another embodiment of microprocessor 10 is configured to generate a BBSB miss whenever a BBC miss occurs, thereby re-synchronizing basic block boundaries after the code modification. This is discussed in greater detail further below.

Basic Block Mispredictions

Basic block mispredictions may be detected by functional units 24A–N and branch prediction unit 14 during the execution stage. This is done by comparing the calculated branch address with the predicted branch address and examining the branch direction. If the two addresses are not identical, there may be two reasons. First, the branch direction might have been mispredicted (i.e., the predictor stored in BBSB 42 predicted the wrong branch direction). Second, the predicted branch target address might have been wrong. This could occur as a result of a change in the address of a taken branch. In this case the branch direction prediction was correct, but the taken branch address changed.

Thus, there are three different causes for basic block mispredictions: (1) a branch is mispredicted as taken, (2) a branch is mispredicted as not taken, and (3) the branch was correctly predicted as taken but the branch target address was wrong. Possible methods to recover from each of these basic block mispredictions are highlighted below. Since branch prediction unit 12 and functional units 24A–N may detect that the branch was mispredicted during the execution stage, the recovery steps may begin in the next clock. Note that for explanatory purposes the following examples assume that all accesses to BBSB 42 and BBC 44 hit. Otherwise, the recovery actions discussed above may be performed in addition to the basic block misprediction recovery.

Misprediction Recovery

Functional units 24A–C send the correct address together with the correct branch direction to BBSB 42. BBSB 42's fetch logic 46 may updates BBSB 42's entries as follow First, the predictor field 94 may be updated with the branch direction information. Second, the basic block address field 90 (i.e., the taken or not taken branch address field) is updated with the branch target address.

This may be performed for all cases of wrong target addresses, as well as the initial address load when the basic block address field is empty in the BBSB entry, which may occur after a BBSB entry is first generated. However, this may not need to be performed if only the branch direction is mispredicted (but the target address is correct). However, in some embodiments BBSB 42 may be configured to perform the write because it would merely over write the previous (correct) address with a copy of itself.

Next, a determination may be made as to whether the mispredicted basic block was the second basic block in a BBSB entry or the starting basic block of the next BBSB entry. If it was the second basic block, then the BBC is looked up with the new address of the basic block. Assuming a hit occurs, at the end of the clock cycle the basic block will be available to reorder buffer 32. From there, the instructions step through the final parts of the pipeline. Note that in this case only four instructions (1 basic block) are dispatched. The other instructions are NULL instructions. Next, the predictor for the third basic block is used to access BBSB 44 again. Instead, if it was the starting basic block of the next BBSB entry, then BBSB 42 is looked up using the new address.

Advantageously, in this embodiment the misprediction latency may be small. If the accesses hit in BBSB 42 and BBC 44, then an exemplary latency may be four clock cycles as shown in the table in FIG. 17. In the figure, BBSB1 creates the misprediction, and BBSBC is the correct BBSB entry. Thus, the upper pipeline stages do not take part in the misprediction recovery if all accesses hit in BBSB 42 and BBC 44.

Prediction Information

In one embodiment, BBSB 42 may be configured to send the following information about the basic block sequence to branch prediction unit 14: (1) the predicted address of next basic block, (2) the pointer to the BBSB entry, and (3) an identifier of the branch path with the basic block tree (e.g., BB1__0, BB2__0, BB2__1).

Branch prediction unit 14 may use the predicted address of the next basic block during execution to determine whether the branch was correctly predicted or mispredicted. If the branch was correctly predicted, then branch unit 14 may send that information to BBSB 42 together with the other information listed above (i.e., items 2 and 3). If, on the other hand, the branch was mispredicted, then branch prediction unit 14 may send that information to BBSB 42 together with the other information (i.e., items 2 and 3) and the new branch target address. BBSB 42 may be configured to take that information and use it to update the stored information of the indicated branch in the indicated BBSB entry. For example, for BR1__0 it may send the address of predicted BB2__x, and for BR2__x the address of predicted BB3__x. It may also send the BBSB entry number for BB1__0.

Coherency

In one embodiment, microprocessor 10, BBSB 42 and BBC 44 are fully coherent. This means that changes made to instruction cache 16 are also reflected in BBSB 42 and BBC 44. While normal code does not alter the contents of the instruction memory space (stored in instruction cache 16), self-modifying code does. Self-modifying code is rare, and thus some embodiments of microprocessor 10 may not be configured to support it and or may not be optimized for it.

Advantageously, instruction cache 16 may play a significant role in reducing the invalidation overhead incurred by BBSB 42 and BBC 44. In one embodiment, BBC 44 and instruction cache 16 may provide "inclusion", meaning that every instruction contained in BBC 44 also is in instruction cache 16. Given inclusion, instruction cache 16 may then filter all relevant invalidation requests to BBC 44. Only invalid requests which hit in instruction cache 16 are sent to BBC 44. This may be important in some embodiments because otherwise any invalid request, whether it is contained in BBC 44 or not, goes to BBC 44 and BBSB 42. The same is true for data space invalidation, because it is not initially known whether the request will hit in BBC 44. Thus, if instruction cache 16 were omitted, there may be a performance penalty due to all the invalidation requests directed to BBC 44 and BBSB 42 even though they do not hit in BBC 44. Therefore, instruction cache 16 may be advantageous for performance in certain embodiments.

Coherency handling may be split into 2 parts. The first part is the invalidation process, while the second part is the resynchronization process. Each part is described in detail below.

Invalidation Process

In one embodiment, coherency is achieved by invalidation. Advantageously, using invalidation instead of updating may reduce the need for complex decoding and resynchronization (due to the unpredictable lengths of instructions). Furthermore, invalidation may in some embodiments be limited to BBC entries (i.e., not invalidating the BBSB entries).

For example, in one embodiment, if a basic block is the second basic block in a sequence, then the basic block address may not be easily looked up in BBSB 42. Only the start address of the first basic block may be looked up. In addition, multiple BBSB entries might point to the same BBC entry for the second basic block. Therefore, it may be difficult to ensure that all BBSB entries are invalidated for a given basic block address.

Thus, in one embodiment, only the BBC entry is invalidated.

To reduce the amount of hardware used by this embodiment, a conservative approach may be used that invalidates more instructions than may be necessary. One such conservative embodiment, is described below.

Each time a write to instruction cache 16 occurs, the associated address is passed to the fetch logic 46 of BBSB 42 and BBC 44 for use as an invalidation address (INV_ADR). However, since the basic block starting addresses may not coincide with the invalidation address, an invalidation window may be used instead of just the single invalidation address. The invalidation window may have the same size as individual lines within instruction cache 16. For example, the line size may be 32 bytes long.

Using the invalidation window, each line in BBC 44 is invalidated if it is selected with the index and the UP_TAG matches the INV_ADR. The LOW_TAG field is not considered. Thus, for invalidation the basic blocks start at an address where the lowest three address bits (A2–A0) are zero. For example, for a particular INV_ADR all instructions in the range from INV_ADR up to INV_ADR+31 may be invalidated.

In one embodiment, invalidation may cover two cases. The first is when the INV_ADR is less than or equal to the basic block starting address. In this case the invalidation window covers the basic block. The second case is when the INV_ADR is greater than the basic block starting address. In this case, the basic block runs into the invalidation window.

Figures 17, 18:
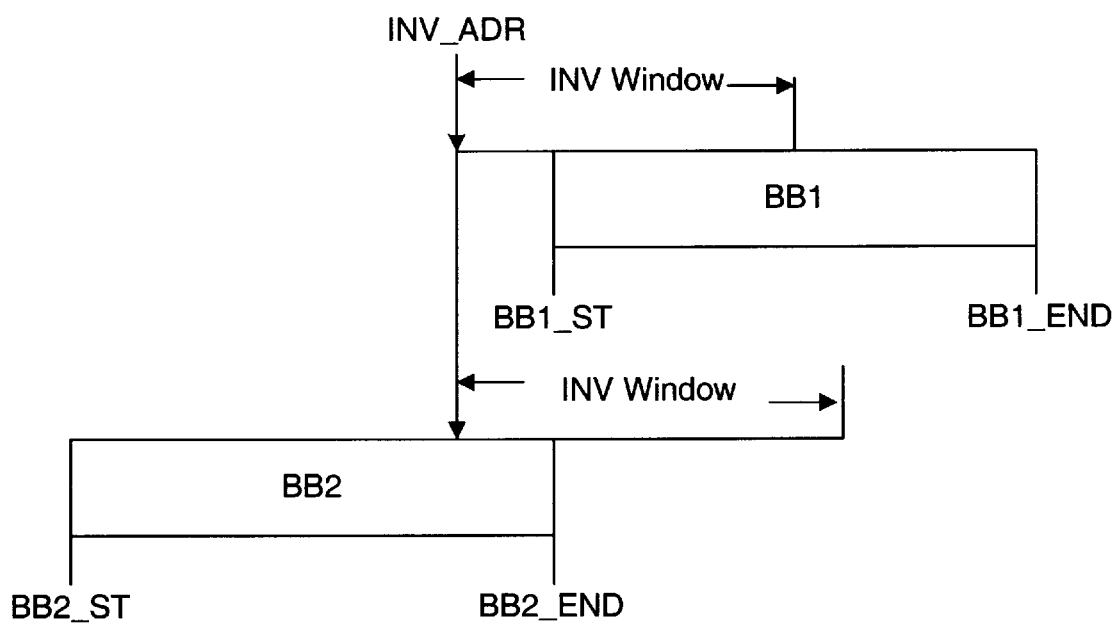
FIG. 17 is a diagram illustrating an exemplary latency of instructions propagating through one embodiment of the microprocessor from FIG. 2.
FIG. 18 is a diagram illustrating relative basic block positions.

Turning now to FIG. 18, a graphical representation of these two cases is shown. In the figure, basic block BB1 illustrates case 1, while basic block BB2 illustrates case 2. Each case is discussed separately below.

Case 1: INV_ADR<=Basic Block Starting Address

Assuming the invalidation window spans 32 bytes, and BBC 44 has a step size of eight bytes, then four BBC lines (with indexes 0–3) may be covered by the invalidation window. To invalidate all possible combinations of four lines, the INV_ADR is divided into sections.

An example of this division is illustrated in FIG. 19. As the figure illustrates, bits 31-5 may be taken from the INV_ADR, while bits 4-3 may represent the index which is incremented from zero to three, and bits 2-0 may be zero. Using these sections, fetch logic 46 may execute four different invalidations. Bit 31-5 and 2-0 of the invalidation addresses may remain constant while the index is incremented from zero to three. Thus, a line is invalidated if the index selects the line and the UP_TAG matches part of UP_INV_ADR. As mentioned before, the LOW_TAG field need not be used for the comparison. This allows invalidation of basic blocks having LOW_TAG's not equal to zero.

This process also provides for invalidation for short basic blocks (i.e., those less than eight bytes long). If a basic block is shorter than eight bytes, then the next sequential basic block may possibly have the same index and UP_TAG and a different LOW_TAG (i.e., sharing the same set/index but in a different way/column). Advantageously, the process described above may be used to invalidate all four ways with a given index and UP_TAG, thus addressing the concern of short basic blocks.

Case 2: INV-ADR>Basic Block Starting Address

In the event that the basic block starts at an address below the INV_ADR, it may extend into the invalidation window. To address this possibility, these instructions may also be invalidated. In one embodiment this is accomplished by subtracting the maximum basic block length from the INV_ADR as indicated by the following equation: (INV_ADR_LOW)=(INV-ADR)−(Maximum Basic Block Length). The generation of INV_ADR_LOW is illustrated in FIG. 20. INV_ADR_LOW may be used instead of INV_ADR to invalidate the BBC entries. This process may be performed in a similar fashion to that of case one above, except for using INV_ADR_LOW instead of INV_ADR.

Assuming for explanatory purposes that the maximum basic block length 60 bytes long (i.e., 4×maximum instruction length=4×15 byte=60 bytes), using an index resolution of eight bytes would result in eight invalidation cycles. This may, however, be reduced if the maximum basic block size is limited to a smaller size, e.g., 32 bytes. The process of limiting the maximum basic block length is described below. Assuming an embodiment of microprocessor 10 has limited the maximum basic block size length to 32 bytes, then the invalidation process may be reduced to only 4 invalidation cycles (index 0–3).

Limiting the Maximum Basic Block Length

As previously noted, in some embodiment, microprocessor 10 may limit the size of basic blocks. This limiting may be performed when BBC 44 is filled, or during the instruction decode and basic block formation process. For example, decode unit 20 may be configured to determine the size of the basic block during decoding. If a particular instruction would exceed the maximum basic block length (e.g., 32 bytes), then it is put into the next sequential basic block and the first block is marked to be followed by a sequential block. The empty instruction slot in the first basic block may be filled with a NULL instruction as shown in FIG. 21.

As the figure illustrates, INS4 would have exceeded the maximum basic block length of 32 bytes. Therefore, it was placed into BB2 and the I4 slot was filled with a NULL instruction. This mechanism may be used to limit the maximum basic block length to any particular length. The performance may be somewhat reduced because one instruction slot is not filled with a useful instruction. However, the performance impact may be minimal because a basic block length of more than 32 bytes may be quite rare, depending upon the instruction set and program characteristics.

Invalidation Summary

As the above embodiments indicate, invalidations may deleteriously affect performance if they occur too frequently. Some embodiments may, however, elect to invalidate more instructions than necessary in order to simply the implementation. This is true for instructions within a basic block that begins in the invalidation window but extends outside the invalidation window. In this case the end instruction may be unnecessarily invalidated. In some cases, entire basic blocks may be invalidated unnecessarily. This may be the case with a basic block that is smaller than the maximum basic block size. This is illustrated in FIG. 22. If the block starts after INV_ADR_LOW but ends before INV_ADR, then it may be unnecessarily invalidated.

However, even with unnecessary invalidations, cache coherency is still maintained. Thus, no false instructions are processed. The only potential negative effect may be on performance because additional unnecessary BBC misses may occur. In one embodiment, microprocessor 10 may be configured to detect and avoid these unnecessary invalidations. For example, microprocessor 10 may be configured with invalidation hardware that uses the basic block length information to generate the ending addresses of the basic blocks. Then bounds checking hardware may be used to determine whether the basic block needs to be invalidated or not. However, this more complicated hardware may not be necessary given the relatively low frequency in which such unnecessary invalidations may occur in many implementations.

Resynchronization Process

The resynchronization process may take place after BBC entries have been invalidated and an invalidated BBC entry is requested. In some embodiments, this request may occur if a BBSB miss is executed or a valid BBSB still points to the invalidated BBC entry. As noted above, the BBSB entries may not be invalidated. A BBSB miss may occur if information in BBSB 42 has been replaced after the invalidation but before the request. In that case, a BBSB miss sequence is executed, which correctly refills, aligns, and decodes all instructions into BBSB 42 and BBC 44.

The second case may occur when one or more BBC entries (basic blocks) are invalidated, but one or more BBSB entries still contain pointers to these entries. Turning now to FIG. 23, an example of what may occur during the code modifications in instruction cache 16 is shown. The figure illustrates one worst case scenario that involves changing the number of instructions for a particular address window.

The example shows a JMP instruction that has been modified into two other instructions. Thus, INS21 is now sequential to INS15, whereas before the modification the JMP instruction branched to a different location. This also affects the block boundaries of BB2 because BB1 may only hold four instructions in this embodiment. In a different example, the opposite result may occur, wherein INS14 and INS15 are transformed into a JMP instruction. Thus, that after a BBC entry has been modified, the following basic blocks may need to be rebuilt.

To address this, BBC 44 may be configured so that BBC 44 misses result in a BBSB miss sequence to rebuild all the of the basic blocks. If only one BBC entry is a miss, this will result in the BBSB miss sequence previously described. The miss sequence may be repeated for multiple basic blocks depending upon the code changes. It may stop when the second basic blocks in a BBSB entry are once again valid in BBC 44. Thus, the sequence is identical to starting from scratch until valid BBC entries are reached. After that, the BBC entries will have been correctly rebuilt.

After the above BBSB miss sequence has been executed, there may still be one additional case to consider. Assuming that all the BBC entries have been filled with valid basic block information, other BBSB entries may point to the changed BBC entries as their second or third basic block. If an access to the entry that points to a changed entry results in a BBC miss, it will trigger the BBSB miss process described above that will re-synchronize the changed entries.

However, in some cases the second basic block may have changed length. If the second basic block is marked as having a sequential following basic block and no branch is contained in the new basic block, then the pointer to the third basic block may still point to the old third basic block position. This may result in the wrong basic block being loaded. This situation is illustrated in FIG. 24.

To avoid this potential problem, the next predicted sequential basic block address ("pred_next_basic_block") may be compared with the calculated next basic block address ("calc_next_basic_block"), which is defined as follows: (calc next_basic block)=(start_act_basic block)+ (basic_block_length). If the predicted next basic block address is not equal to the calculated next basic block address, then the mispredicted sequence must be executed. In one embodiment, this comparison may be performed in functional units 24A–N or branch prediction unit 14 in a similar manner to the comparisons performed for checking branch predictions.

Note that in some cases this may affect reorder buffer 32. For example, the instructions from the old BB3 may be speculatively executed. The comparison may show that the target address for the sequential feich was wrong. Thus, the instructions from BB3 in reorder buffer 32 may need to be invalidated. In the example above, however, the final instructions from BB2 may have higher addresses than the first instruction from the old BB3.

Note, that in the examples above, BBSB entries do not depend on the contents of BBC 44. If a basic block contains different instructions or a different number of instructions (but not more than four instructions), then the BBSB entries are not changed until the BBC changes create different start or end addresses for the basic blocks. Thus, BBSB 42 simply provides the pointers to the basic blocks. In this case, the changes to the contents of the basic blocks in BBC 44 do not affect the pointers within BBSB 42. Thus, BBSB may need to be updated only if the pointers need to be changed. This relationship is illustrated in FIG. 25.

Overlapping Detection for Long Basic Blocks

In some embodiments of microprocessor 10, overlapping detection for long basic blocks may be implemented to improve performance in certain cases. As previously noted, a long basic block is a long series of sequential instructions. For example, if fifty instructions are sequentially executed without any interceding control instructions (e.g., JMPs), then the sequence will be stored as a long basic block comprising a number of individual basic blocks linked by pointers stored in BBSB 42.

Difficulties may arise, however, if individual basic blocks within the long basic block are used by different runs through the basic block sequence. An example of this is illustrated in the code sequence of FIG. 26. In this code sequence, the JMP instructions jumps into different parts of the basic block depending upon the variable. The sequence always ends at the end of the basic block. This mechanism is sometimes used in graphics applications to avoid loop control code. In such code, the three instructions of each label (i.e., L1, L2, L3, L4) are identical and represent the loop code. The starting point is then determined by how often the loop should execute. For example, if the loop should execute twice, then the JMP instruction would target L3. There are also other applications for this type of code.

The code in the figure may create problems for the embodiments of microprocessor 10 as described above. In particular, assuming that the first run through the code would start at L1, then all instructions from INS1 up to INS43 will be stored in BBSB 42 and BBC 44 as described above. In one embodiment, the instructions will be stored in BBC 44 as illustrated in FIG. 27. In BBSB 42, the basic blocks X through X+2 are marked as sequential basic blocks.

Figure 28:
FIG. 28 is a diagram illustrating another possible method for storing instructions within one embodiment of the BBC from FIG. 2.

However, the next time the processor runs through the long basic block it could possibly start at L2. So the address of L2 is looked up in BBSB 42. No hit occurs because L2 is not a starting address of a basic block and because INS21 is in slot 14 of the basic block X and therefore cannot be looked up. This generates a BBSB miss sequence and BBSB 42 and BBC 44 are filled from instruction cache 16 as previously described. Thus, in addition to the previous entries, the basic blocks are once again stored in BBC 44 and BBSB 42 with a different alignment. In one embodiment, the instructions may be put in BBC 44 as illustrated in FIG. 28.

As a result, the same instructions (I21–I43) are stored twice in BBC 44 and BBSB 42 with different basic block alignments. This may be advantageous because it allows BBC 44 to send the instructions straight to the functional execution slots. This so called "overlapping" may continue until a basic block of the old sequence starts at the same address as a basic block of the new sequence. Thus, when multiple different paths through the same long basic block are executed, BBSB 44 and BBC 42 may become polluted with different basic block alignments of the same instructions. This may reduce the efficiency of BBSB 44 and BBC 42.

Note, however, that the behavior described above may rarely occur in normal code. In normal code, branches occur quite frequently (e.g., every 4–6 instructions). The branches mark the ends of each basic block (after which the next basic block starts). Thus, the frequent branch instructions provide a re-synchronization function for the basic block alignment. So even if some code jumps directly into the middle of another basic block, a new basic block will most likely be fetched after a couple of instructions. Then the second run will access a basic block which was generated by the previous run. So in these cases the overlap may only be for a small number of instructions and will probably only result in two different entry points. Thus, the impact of overlapping is small. However, for long runs (e.g., 30 instructions or more) with multiple entry points the scenario is different.

One embodiment of microprocessor 10 configured to address this potential concern is disclosed below. Note, however, that for the reasons explained above, the following mechanism is optimized for execution speed rather than for maximum storage efficiency. Other embodiments are also contemplated.

Figure 30:
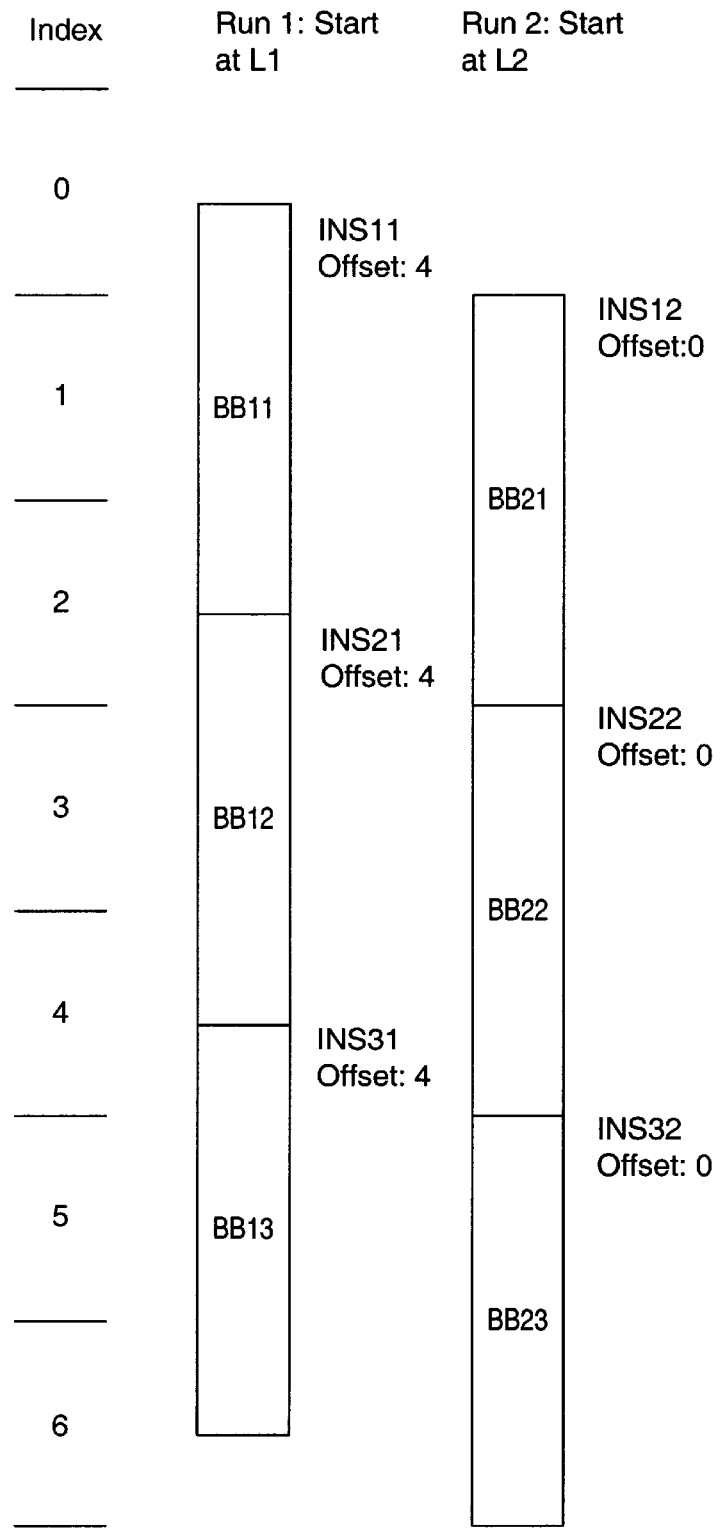
FIG. 30 is a diagram illustrates a "worst case" scenario for the basic block overlapping from FIG. 29.

To assist in the understanding of the operation of this embodiment, a particular "worst case" overlapping scenario is illustrated in FIG. 29. Assuming worst case start index and instruction lengths, then the basic blocks may appear as in FIG. 30. In this example, the basic blocks start with an offset of one instruction. As a worst case, that may translate into two basic block having BBC indexes that differ by one. Thus, if instruction I12 is looked up an index of one is used, whereas instruction I11 translates to an index of zero. This may continue for the next basic blocks in the sequence because (as the example shows) the basic blocks may exactly span two index sizes. This may be a worst case type of scenario, but it may be possible and may deleteriously affect the performance of microprocessor 10.

This problem is highlighted when instruction I12 is looked up for the second run, but basic block BB11 is not at the same index. Thus, BBC 44's fetch logic 46 does not detect the presence of basic block BB11 because it is accessed with an index of zero, not one. In one embodiment, microprocessor 10 may avoid this problem by increasing the size of the BBC lookup performed for a given index value. For example, the lookup process may return as many entries as are necessary to fill a basic block having a maximum length. For this example, the maximum length is assumed to 32 bytes. Thus, the index distance (i.e., the minimum byte length between two sequential indexes) is eight bytes. Therefore, four sequential entries (i.e., those with indexes zero through three) are returned.

Restated, each BBC 44 lookup returns four entries having indexes from zero through three. From these four entries, the requested BBC entry may then be selected using a multiplexer. The other BBC entries may be used to perform comparisons to detect overlapping (described in detail below). In this embodiment, BBC has four ways so a total of sixteen BBC lines are returned.

Figure 31:
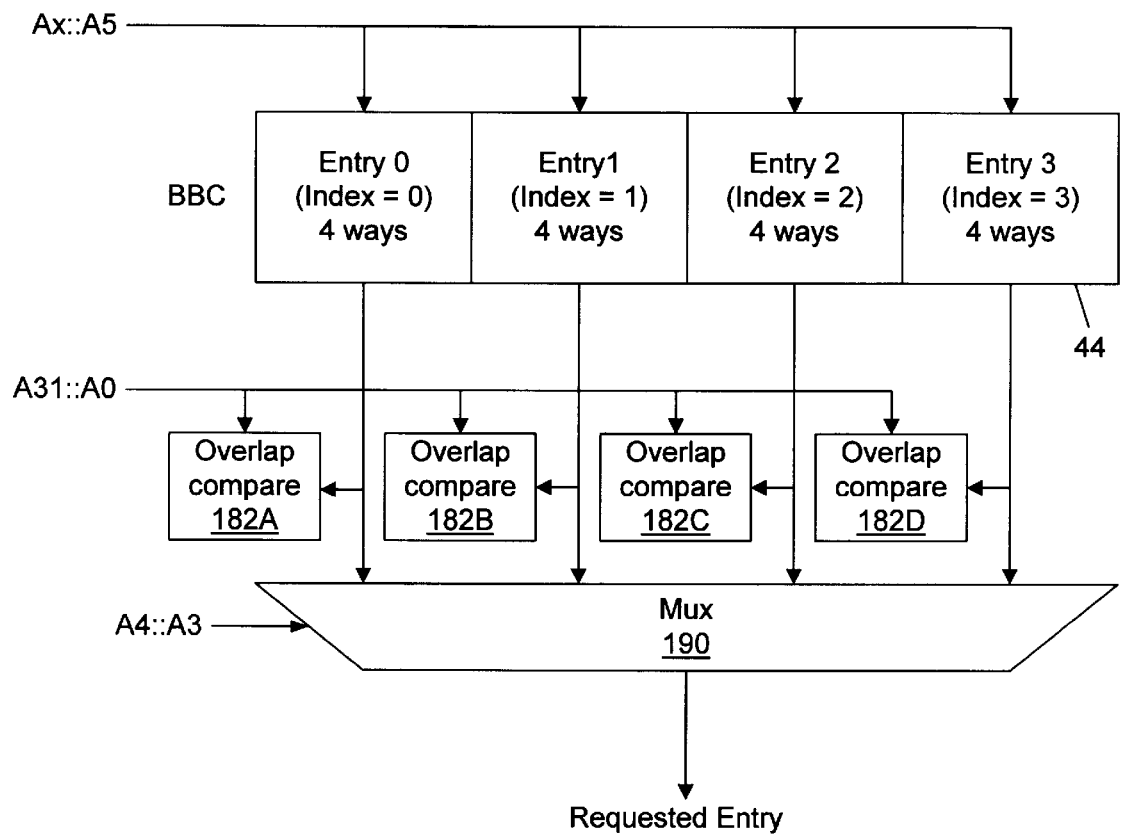
FIG. 31 is a diagram illustrating multiple entry lookup within one embodiment of the BBC from FIG. 2.

Turning now to FIG. 31, one embodiment of BBC 44 capable of outputting multiple lines per index is illustrated. As per the figure, BBC 44 may be addressed with address bits Ax-A5 (whereas x is dependent upon the size of BBC 44). After receiving these address bits, BBC 44 may then output the four corresponding entries, starting with index zero. A4 and A3 address bits are "don't care" bits for the BBC lookup. Instead, they are used in multiplexer 190 to select the desired entry. Comparators 182A–D perform comparisons to detect any overlaps.

Detecting Overlaps at Basic Block Boundaries

As previously described, overlapping can occur if different runs through the same basic blocks have different footprints. The previous section described a detection method for basic blocks having different alignments at the instruction level. This section describes another case, i.e., where overlapping occurs at the basic block boundary level. This may occurs if a case or switch instruction within a loop skips a basic block. An example of this is shown in FIG. 32.

Figures 32, 33:
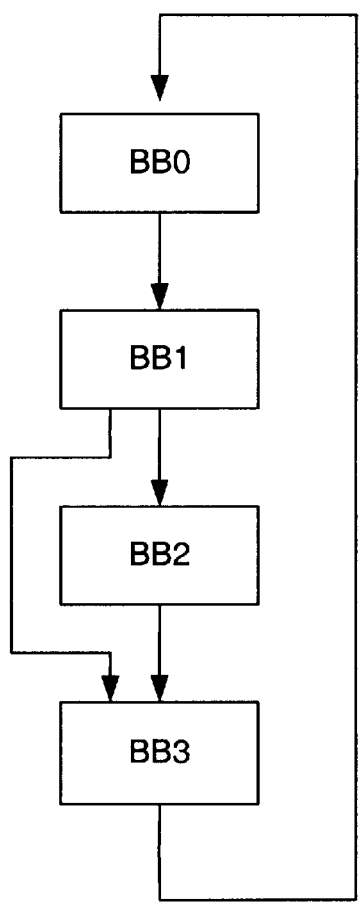
FIG. 32 is a diagram illustrating instruction sequences with different basic block footprints.
FIG. 33 is a diagram illustrating an example of sequence entries within one embodiment of the BBSB from FIG. 2.

Turning now to FIG. 33, an example of the sequence entries within BBSB 42 generated by these different footprints is shown. As the figure illustrates, in the case illustrated above four different BBSB entries are allocated for the four basic blocks. This may be advantageous because only then will the basic blocks be properly aligned so that two basic blocks may be dispatched in parallel. It may also allow the global branch prediction scheme to work more efficiently.

However, there may be cases where BBSB 42 becomes overloaded with different footprints of the same basic blocks. In such cases it may be desirable to detect if different footprints are present in BBSB 42. The potential difficulty may be with the second basic block. The first basic block may not create a problem because in this embodiment there is only one entry for each basic block.

To detect the address of the second basic block, a special overlap tag (OTAG) array may be used. When BBSB 42 outputs the second basic block address, it may be used in the next clock cycle to perform a lookup in the OTAG array. The OTAG array may be configured to store the first basic block tags from BBSB 42. This OTAG lookup may indicate whether the second basic block address is also stored as a tag for a first basic block in BBSB 42. If this is the case, then overlapping exists.

In the example in the figure, in cycle 3 basic block 0 is the second basic block. The lookup of the OTAG in cycle 4 would indicate that basic block 0 already exists in entry 0 of BBSB 42. In one embodiment, a counter may be included to track how often overlaps occur. Using the counter's information, a determination may be made as to whether a re-synchronization should be performed to the basic block already stored in BBSB 42 or not. This may result in a tradeoff between performance and storage efficiency because a re-synchronization may reduce performance. BBSB 42 may be configured to ensure that the tags stored in the OTAG array are identical to the tags stored in BBSB 42. Advantageously, this method may provide control over basic block overlapping that occurs at the basic block boundary level.

Still other embodiments are contemplated. For example, one embodiment of microprocessor 10 may be configured to determine whether an access hits in BBC 44 even though the access misses in BBSB 42. If the access only misses in BBSB 42, then recovery time may be reduced by using the instructions within BBC 44. Instead, a new entry in BBSB 42 is allocated. In yet another embodiment, the second more speculative basic block may be stored in an immediate buffer during BBC 44 fills. This may prevent use of BBC 44 in the case of a misprediction.

In other embodiments, the hardware required for BBC 44 and BBSB 42 may be reduced in quantity and complexity. For example, BBC 44 may be configured with a single write port in lieu of dual write ports. While this may affect the number of clock cycles need to store two basic blocks, it may not necessarily impact overall performance to any large extent if a buffer is used to store the second block to be written.

Example Computer System

Figure 34:
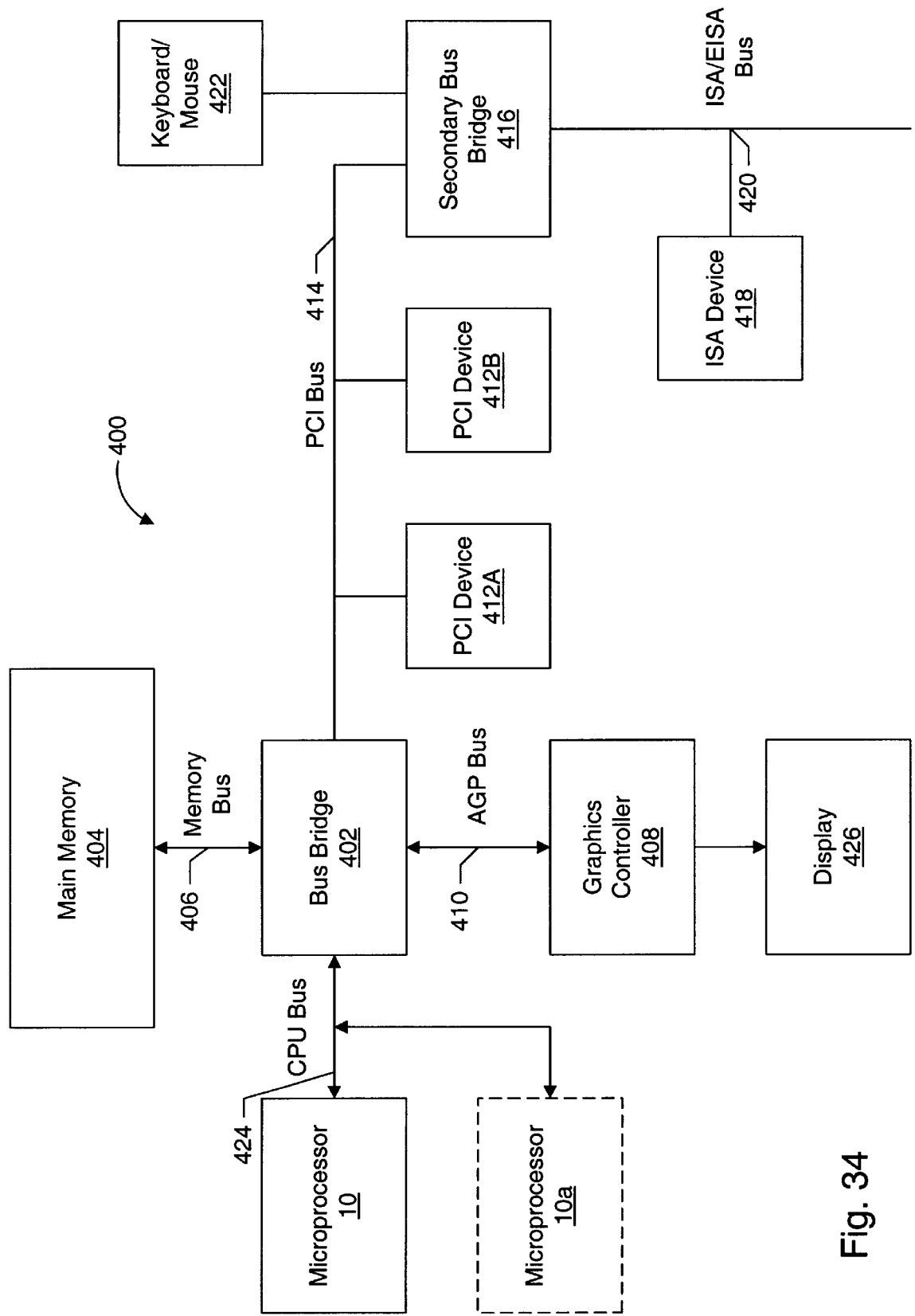
FIG. 34 is a block diagram of one embodiment of a computer system configured to utilize the microprocessor of FIG. 2.

Turning now to FIG. 34, a block diagram of a computer system 400 including microprocessor 10 coupled to a variety of system components through a bus bridge 402 is shown. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

In addition to providing an interface to an ISA/EISA bus, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bridge logic unit 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc. It is noted that, while the AGP, PCI, and ISA or EISA buses have been used as examples in the above description, any bus architectures may be substituted as desired.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

A microprocessor and computer system capable of caching basic blocks of instructions has been disclosed. A method for operating a basic block oriented data cache has also been disclosed. Numerous variations and modifications will become apparent to those skilled in the art once the above disclosure is fully appreciated, particularly in light of the number of different embodiments disclosed. It is intended that the following claims be interpreted to embrace all such variations and modifications.

What is claimed is:

1. A microprocessor configured to cache basic blocks of instructions comprising:

a basic block cache configured to store basic blocks of instructions, wherein each basic block begins with an instruction that is a target of a branch instruction and ends with a subsequent branch instruction;

a basic block sequence buffer coupled to said basic block cache and configured to store block sequence entries comprising an address tag and one or more basic block pointers, wherein said address tag corresponds to the fetch address of a particular basic block stored in said basic block cache, and wherein said pointers point to basic blocks that follow said particular basic block in program order; and decoding logic coupled to said basic block cache, wherein said decoding logic is configured to form basic blocks having a predetermined number of instructions by padding instruction sequences having less than said predetermined number of instructions with NULL instructions.

2. The microprocessor as recited in claim 1, wherein said decoding logic is configured to form basic blocks having said predetermined number of instructions by dividing instruction sequences having more than said predetermined number of instructions into multiple basic blocks, wherein all but the last of said multiple basic blocks end with NULL instructions.

3. The microprocessor as recited in claim 2, wherein said decoding logic is further configured to generate and store operand register dependency information with each basic block in said basic block cache.

4. The microprocessor as recited in claim 2, wherein said basic block cache is multi-ported and configured to receive at least two pointers from said basic block sequencer buffer and output at least two basic blocks in parallel.

5. The microprocessor as recited in claim 2, further comprising:
   reorder buffer logic coupled to receive said basic blocks from said basic block cache; and
   a plurality of functional units coupled to said reorder buffer logic, wherein the number of functional units is equal to at least twice the predetermined number of instructions in each basic block.

6. The microprocessor as recited in claim 5, further comprising a level one instruction cache coupled to receive said fetch address and output a plurality of instruction bytes to said decoding logic in the event said fetch address misses in said basic block sequence buffer.

7. The microprocessor as recited in claim 6, wherein said level one instruction cache and said basic block cache maintain coherency.

8. The microprocessor as recited in claim 7, further comprising:
   an overlap tag array coupled to said basic block sequence buffer and configured to store copies of the address tags stored within said basic block sequence buffer, and
   comparison logic coupled to said overlap tag array and configured to receive a subset of the pointers output by the basic block sequence buffer, wherein said comparison logic is configured to compare said received pointers with the tags stored within the overlap tag array.

9. The microprocessor as recited in claim 8, further comprising an intermediate storage buffer coupled to said basic block sequence buffer and configured to store basic blocks that are part of the predicted basic block sequence and that are highly speculative.

10. The microprocessor as recited in claim 9, wherein said basic block cache is single-ported for writes.

11. The microprocessor as recited in claim 1, further comprising decoding logic coupled to said basic block cache, wherein said decoding logic is configured to truncate basic blocks longer than a predetermined number of bytes by replacing any instructions that extend the length of basic block beyond the predetermined number of bytes with NULL instructions, wherein the decoding logic is configured to include the replaced instruction in the next basic block to be formed.

12. The microprocessor as recited in claim 1, wherein each block sequence entry comprises two basic block pointers and a prediction bit, wherein one pointer points to the basic block that follows said particular basic if the branch instruction at the end of said particular basic block is taken, wherein one pointer points to the basic block that follows said particular basic block if the branch instruction at the end of said particular basic block is not taken, and wherein said prediction bit indicates whether the branch instruction at the end of said particular basic block is predicted taken or not taken.

13. The microprocessor as recited in claim 12, wherein said prediction bits determine which pointers are conveyed to said basic block cache.

14. The microprocessor as recited in claim 13, wherein each block sequence entry further comprises additional branch pointers and prediction bits.

15. The microprocessor as recited in claim 14, wherein each block sequence entry further comprises line status and line replacement information.

16. The microprocessor as recited in claim 14, wherein said basic blocks comprise aligned and decoded instructions.

17. A method of operating a cache within a microprocessor comprising:
   receiving instruction bytes corresponding to a fetch address;
   decoding said instruction bytes into instructions;
   forming basic blocks of instructions by:
      grouping the instructions into basic blocks that end with branch instructions;
      padding the basic blocks with NULL instructions if the basic blocks have less than a predetermined number of instructions;
      dividing the basic blocks into two or more basic blocks if the basic blocks have more than the predetermined number of instructions;
   storing the basic blocks into a basic block cache; and
   storing pointers to the basic blocks into a basic block sequence buffer.

18. The method of operating a cache as recited in claim 17, further comprising:
   storing predicted sequences of basic block pointers in the basic block sequence buffer;
   accessing the basic block sequence buffer with a fetch address; and
   outputting a predicted sequence of basic block pointers corresponding to the fetch address.

19. The method as recited in claim 18, further comprising:
   recovering from a fetch address miss in the basic block sequence buffer by:
      accessing a level one cache with the fetch address;
      reading a plurality of instruction bytes corresponding to the fetch address from the level one cache;
      decoding the plurality of instruction bytes into instructions;
      forwarding the decoded instructions to a reorder buffer in preparation for execution;
      forming basic blocks from the decoded instructions;
      storing the basic blocks into a basic block cache; and
      storing pointers to the basic blocks into a basic block sequence buffer.

20. The method as recited in claim 18, further comprising:
   recovering from a fetch address miss in the basic block cache by:
      accessing a level one cache with the pointer from the basic block sequence buffer that missed in the basic block cache;
      reading a plurality of instruction bytes from a level one cache, wherein the plurality of instruction bytes correspond to the pointer that missed in the basic block cache;
      decoding the plurality of instruction bytes into instructions;
      forwarding the decoded instructions to a reorder buffer in preparation for execution;
      forming basic blocks from the decoded instructions; and
      storing the basic blocks into a basic block cache.

21. The method as recited in claim 18, further comprising:

recovering from a mispredicted branch instruction by:
determining the correct target address and branch direction using a functional unit; and updating the basic block sequence buffer by:
replacing the old pointers and old prediction information with the newly determined correct target address and branch direction.

22. The method as recited in claim 21, further comprising maintaining data coherency between the level one instruction cache and the basic block cache when a write to the level one instruction cache is performed by invalidating all basic blocks within the basic block cache that overlap the range of addresses overwritten in the level one instruction cache.

23. The method as recited in claim 22, further comprising re-synchronizing the level one instruction cache and the basic block cache after a write to the level one instruction cache by:

reading the instruction bytes corresponding to the invalidated basic blocks in the basic block buffer;

decoding the corresponding instruction bytes into instructions;

forming the instructions into new basic blocks;

saving the invalidated basic blocks in the basic block cache with the new basic blocks; and validating the new basic blocks in the basic block cache.

24. The method as recited in claim 23, further comprising:

storing copies of the tags stored within the basic block sequence buffer;

comparing the stored copies of the tags with the addresses output by the basic block cache to determine if basic block overlapping has occurred; and re-synching the pointers stored in the basic block sequence buffer and the overlapping basic blocks stored in the basic block cache.

25. The method as recited in claim 24, further comprising:

determining whether the fetch address hits in the basic block cache when the fetch address misses in the basic block sequence buffer;

outputting the matching basic blocks from the basic block cache; and allocating a corresponding entry in the basic block sequence buffer.

26. A computer system configured to cache basic blocks of instructions comprising:

a microprocessor having
a basic block cache configured to store basic blocks of instructions, wherein each basic block comprises a variable number of instructions and ends with a branch instruction, wherein said basic block cache is configured to divide basic blocks greater a predetermined maximum length into two or more separate smaller basic blocks, and a basic block sequence buffer comprising a plurality of storage locations, wherein each storage location is configured to store a block sequence entry comprising an address tag and one or more basic block pointers, wherein said address tag corresponds to the fetch address of a particular basic block, and wherein said pointers point to basic blocks that follow said particular basic block in program order;

a CPU bus coupled to said microprocessor; and a modem coupled to said CPU bus via a bus bridge.

27. The computer system as recited in claim 26, further comprising a second microprocessor coupled to said CPU bus.

* * * * *